(12) United States Patent
Tebbe et al.

(10) Patent No.: US 11,932,447 B2
(45) Date of Patent: Mar. 19, 2024

(54) BITE PROOF SPOUT

(71) Applicant: MUNCHKIN, INC., Van Nuys, CA (US)

(72) Inventors: Mark Gerard Tebbe, Ventura, CA (US); Nairi Khachikian, Glendale, CA (US); Mark A. Hatherill, Beverly Hills, CA (US); Kevin Douglas Johnson, Tarzana, CA (US)

(73) Assignee: Munchkin, Inc., Van Nuys, CA (US)

( * ) Notice: Subject to any disclaimer, the term of this patent is extended or adjusted under 35 U.S.C. 154(b) by 0 days.

(21) Appl. No.: 14/703,843

(22) Filed: May 4, 2015

(65) Prior Publication Data

US 2015/0314929 A1    Nov. 5, 2015

Related U.S. Application Data

(60) Provisional application No. 62/046,869, filed on Sep. 5, 2014, provisional application No. 61/988,077, filed on May 2, 2014.

(51) Int. Cl.
| | |
|---|---|
| *B65D 47/06* | (2006.01) |
| *A45F 3/18* | (2006.01) |
| *B65D 23/10* | (2006.01) |
| *B65D 47/14* | (2006.01) |
| *B29C 43/14* | (2006.01) |
| *B29L 31/00* | (2006.01) |

(52) U.S. Cl.
CPC ............. *B65D 23/102* (2013.01); *A45F 3/18* (2013.01); *B65D 47/06* (2013.01); *B65D 47/147* (2013.01); *B29C 43/145* (2013.01); *B29L 2031/7412* (2013.01)

(58) Field of Classification Search
CPC .................................. B65D 47/06; A45F 3/18
USPC .......................................................... 215/200
See application file for complete search history.

(56) References Cited

U.S. PATENT DOCUMENTS

| | | | | |
|---|---|---|---|---|
| 5,544,766 | A | * | 8/1996 | Dunn ..................... A61J 11/001 |
| | | | | 206/459.5 |
| 2002/0030029 | A1 | | 3/2002 | Hakim |
| 2004/0124168 | A1 | | 7/2004 | Silver |
| 2005/0035078 | A1 | | 2/2005 | Lieberman et al. |
| 2006/0226110 | A1 | | 10/2006 | Choi et al. |
| 2007/0272645 | A1 | | 11/2007 | Ito et al. |
| 2010/0308002 | A1 | | 12/2010 | Vischer et al. |
| 2012/0305577 | A1 | * | 12/2012 | Dunn ................. A47G 19/2266 |
| | | | | 220/660 |

(Continued)

FOREIGN PATENT DOCUMENTS

JP          2006006809 A      1/2006

OTHER PUBLICATIONS

International Search Report and Written Opinion for PCT/US2015/029114 dated Jul. 24, 2015 (pp. 1-15).

(Continued)

*Primary Examiner* — Anthony D Stashick
*Assistant Examiner* — Raven Collins
(74) *Attorney, Agent, or Firm* — Robert Z. Evora

(57) ABSTRACT

A bite-proof spout is disclosed which contains multiple durometer material, such that the higher durometer material is in closer contact to the mouth of a user to be able to withstand biting without undue deterioration than the lower durometer material which is positioned further away from the mouth.

7 Claims, 23 Drawing Sheets

(56) References Cited

U.S. PATENT DOCUMENTS

| | | | | |
|---|---|---|---|---|
| 2013/0126527 A1* | 5/2013 | Chiu | ................... | A47G 21/18 |
| | | | | 220/709 |
| 2014/0076907 A1* | 3/2014 | Hammi | .............. | A47G 19/2266 |
| | | | | 220/714 |
| 2015/0282652 A1* | 10/2015 | Honarvar | .................. | A61J 9/00 |
| | | | | 206/514 |
| 2015/0368006 A1* | 12/2015 | Wiesman | ............... | B65D 47/06 |
| | | | | 222/490 |

OTHER PUBLICATIONS

Extended European Search Report for European Patent Application No. 15 786 235.0 dated Oct. 2, 2017 (pp. 1-8).

\* cited by examiner

FIRST COMPRESSION PROCESS

SECOND COMPRESSION PROCESS

BITE PROOF SPOUT

CROSS REFERENCE TO RELATED APPLICATIONS

This applications claims priority to U.S. Provisional Application Ser. No. 62/046,869, filed Sep. 5, 2014; and to U.S. Provisional Application Ser. No. 61/988,077, filed May 2, 2014; the contents of all of which are hereby incorporated by reference herein in their entirety into this disclosure.

TECHNICAL FIELD

The subject disclosure relates generally to bottles and drinking containers. In particular, the invention relates to a bottle having a hardened, bite proof spout.

BACKGROUND

Conventional bottles with spouts are consistently exposed to harsh biting conditions from young children. After a long period of repeated biting, these spouts may become weakened or damaged causing irregular flow or loose particles. Unfortunately, these deficiencies have not been solved and have never been addressed previously.

BRIEF DESCRIPTION OF THE DRAWINGS

Various exemplary embodiments of this disclosure will be described in detail, wherein like reference numerals refer to identical or similar components or steps, with reference to the following figures, wherein.

DETAILED DESCRIPTION

Particular embodiments of the present invention will now be described in greater detail with reference to the figures.

Figure 1:
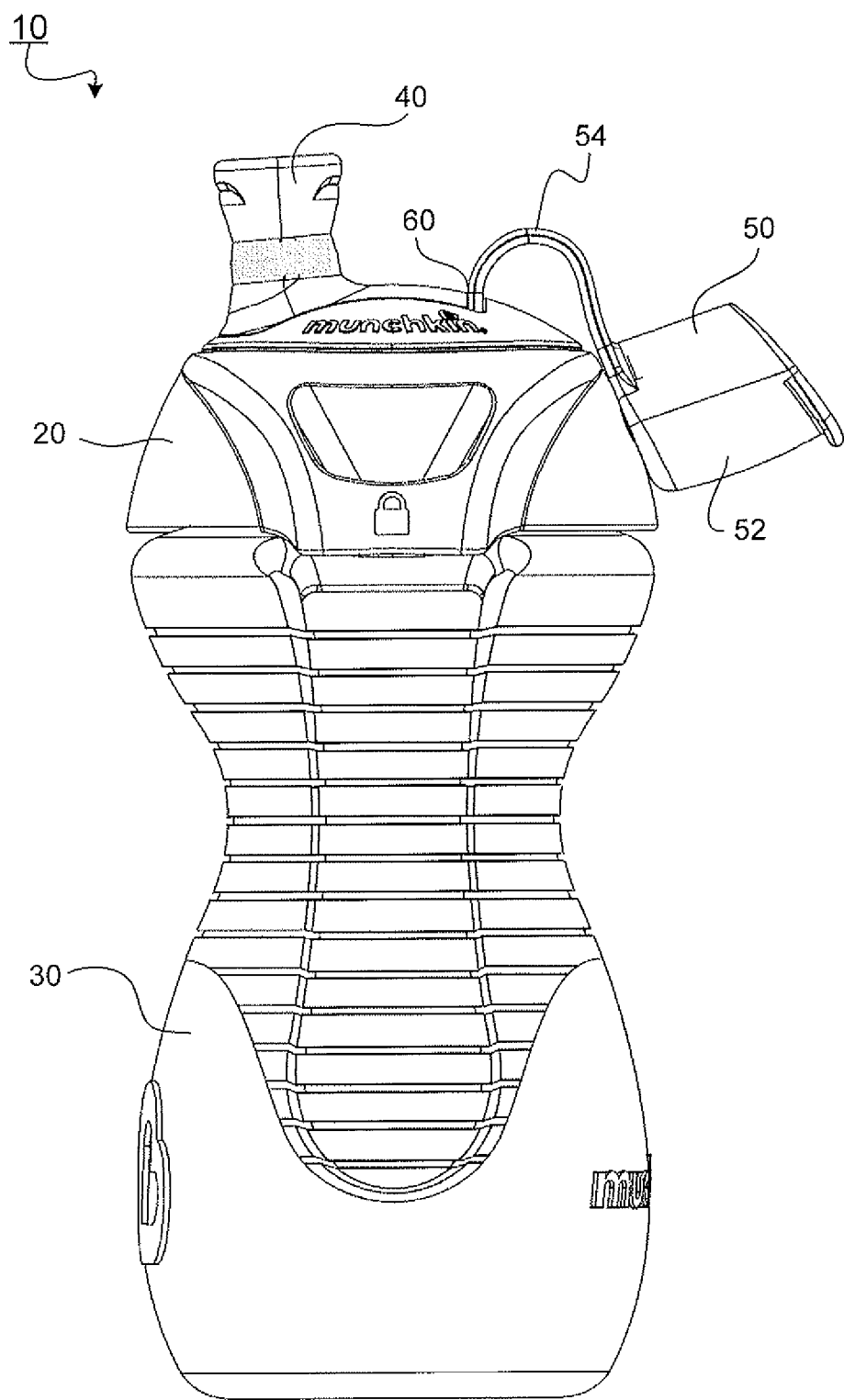
FIG. 1 illustrates a side view of an exemplary bite proof bottle with a pivoting cover according to the subject disclosure.

FIG. 1 illustrates a bottle 10 having a lid 20, a container 30, a spout 40, a cover 50 and a pivoting connection 60 embodied as a strap 54.

Figure 2:
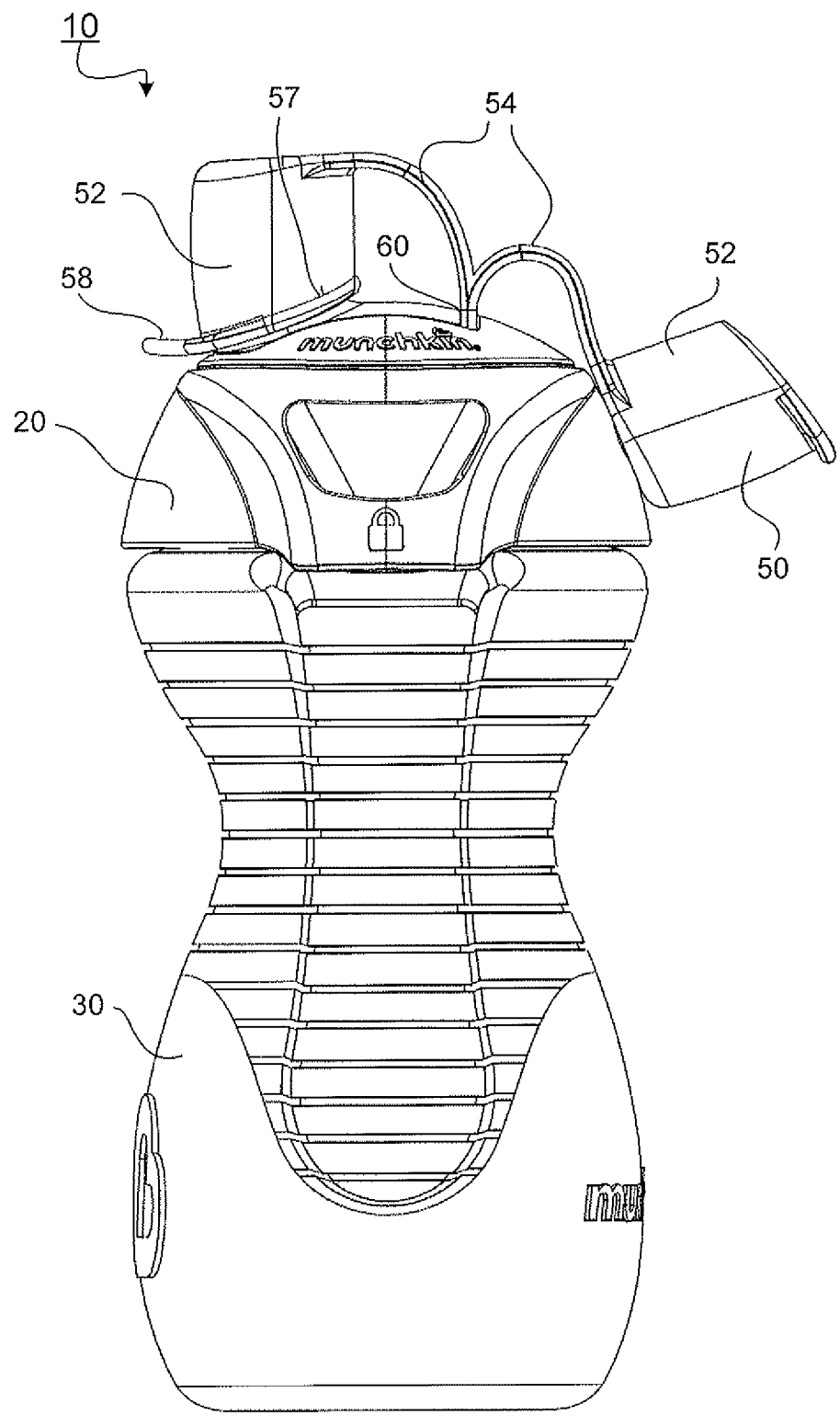
FIG. 2 shows a side view of the bottle with the pivoting cover in both an open and close position.

FIG. 2 shows the cover 50 having a cap portion 52 and the strap 54. The cap portion 52 may be co-molded with the strap 54 which is made of a flexible material such that it allows the cap portion to pivot about the pivoting connection 60. The cap portion 52 may also be of a harder durometer than the strap 54 by using methods later discussed herein. However, the strap 54 may also be made from a second material than the cap portion 52. The cap portion 52 and strap 54 can take a variety of different shapes and sizes and be made from a wide variety of suitable materials with various thicknesses and durometer.

In a closed position, the cover 50 will enclose the spout 40 such to prevent exposure of the spout 40. The cap portion 52 has a shape which generally follows the contour of the spout 40 shape to create a slip-fit frictional connection preventing the cover 50 from slipping off of the spout 40 without a predetermined amount of force to overcome the friction fit. This force should be high enough to keep the cover 50 in a closed position if the bottle 10 is knocked over or dropped, but low enough such that a young child or parent can remove the cover 50 from the spout 40 with ease.

The cap portion 52 may also have a beaded edge 57 and a pull tab 58, which gives a user a place to grip onto for increased leverage of the cover 50 and to facilitate removing the cover 50 from the closed position. In addition, the cap portion 52 may connect directly to the lid 20 or base of the spout 40 by a mating feature between the beaded edge 57 and the spout 40 or lid 20. The mating feature may act as a slip-fit or snap fastener, or any other suitable connection to prevent the cover 50 from slipping off of the spout 40.

Figure 4:
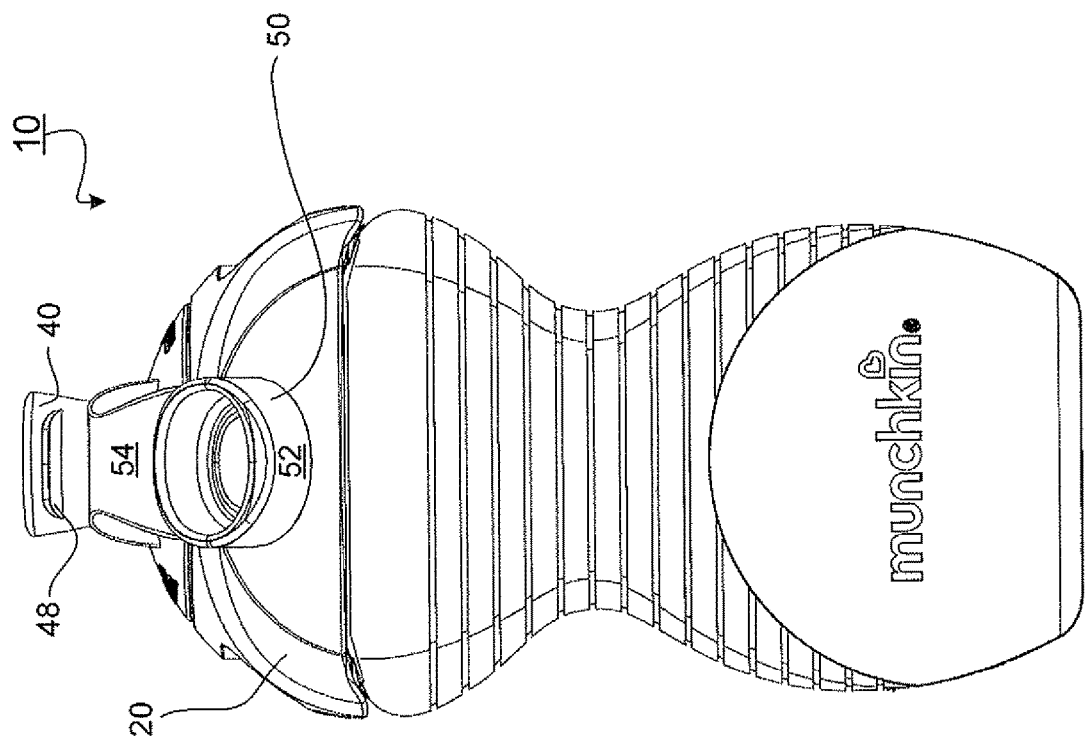
FIG. 4 illustrates a back view of the bottle.
Figure 3:
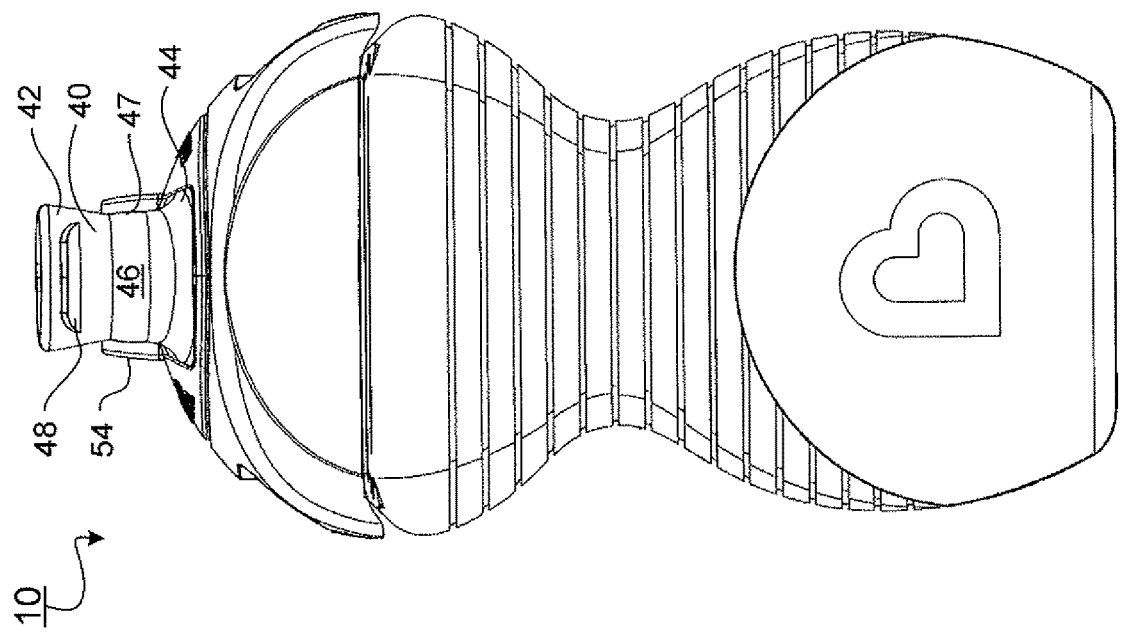
FIG. 3 depicts a front view of the bottle.

FIGS. 3-4 illustrate the spout 40 having a top portion 42, a bottom portion 44, a middle band 46 and a lip 48. The spout 40 can be made in various shapes or sizes, and be made from a variety of suitable materials. An opening in the top portion 42 may be made in the form of a circle, oval, race track, or any other suitable shape.

The middle band 46 acts as a bite guard and subsequently protects the spout 40 from biting of the user. The middle band 46 may have a first durometer and the top portion 42 and bottom portion 44 may have a second durometer. The first durometer is greater than the second durometer in order to provide added bite protection. Alternatively, both the top portion 42 and the middle band 46 may have the first durometer while the bottom portion 44 may have the second durometer, thus protecting the entire upper portion of the spout 40 from gnawing or biting.

The middle band 46 may be manufactured to have a first color while the top portion 42 and bottom portion 44 have a second color. This gives the user a visual indicator of where the material durometer changes and thus where the bite guard is located. Furthermore, using different colors for the middle band 46 may act to distinguish spouts with different durometer bite guards. For instance, a pink middle band 46 may represent a durometer of 70 Shore while a turquoise middle band 46 may represent a durometer of 100 Shore. Any range of durometer values may be used provided a difference in durometer values exist between the first material and second material on the soft top.

The middle band 46 may be extended completely flush with the top portion 42 and bottom portion 44, or may bow out by a predetermined width to form a bump 47 to further distinguish it from the rest of the spout 40. The bump 47 may be located at the top, middle or bottom of the middle band 46, or any combination thereof. The middle band 46 may also include various textures, patterns or designs on its surface or interior to further distinguish it from the rest of the spout 40. Differing the texture of the middle band 46 or providing the bump 47 will provide the user an additional tactile feedback of where the durometer changes when they drink from the bottle 10.

In order to form the difference in durometer, the middle band 46 having the first durometer may be compression molded, and then the rest of the spout 40 having the second durometer may be subsequently liquid injection molded around the middle band 46. In an alternative embodiment, both the top portion 42 and middle band 46 may have the first durometer while the bottom portion 44 has the second durometer. This may be manufactured in the same fashion as the previous embodiment. It also may be manufactured by first compression molding the top portion 42 and middle band 46 with the first durometer, then subsequently compression molding the bottom portion 44 with the second durometer.

Figure 5:
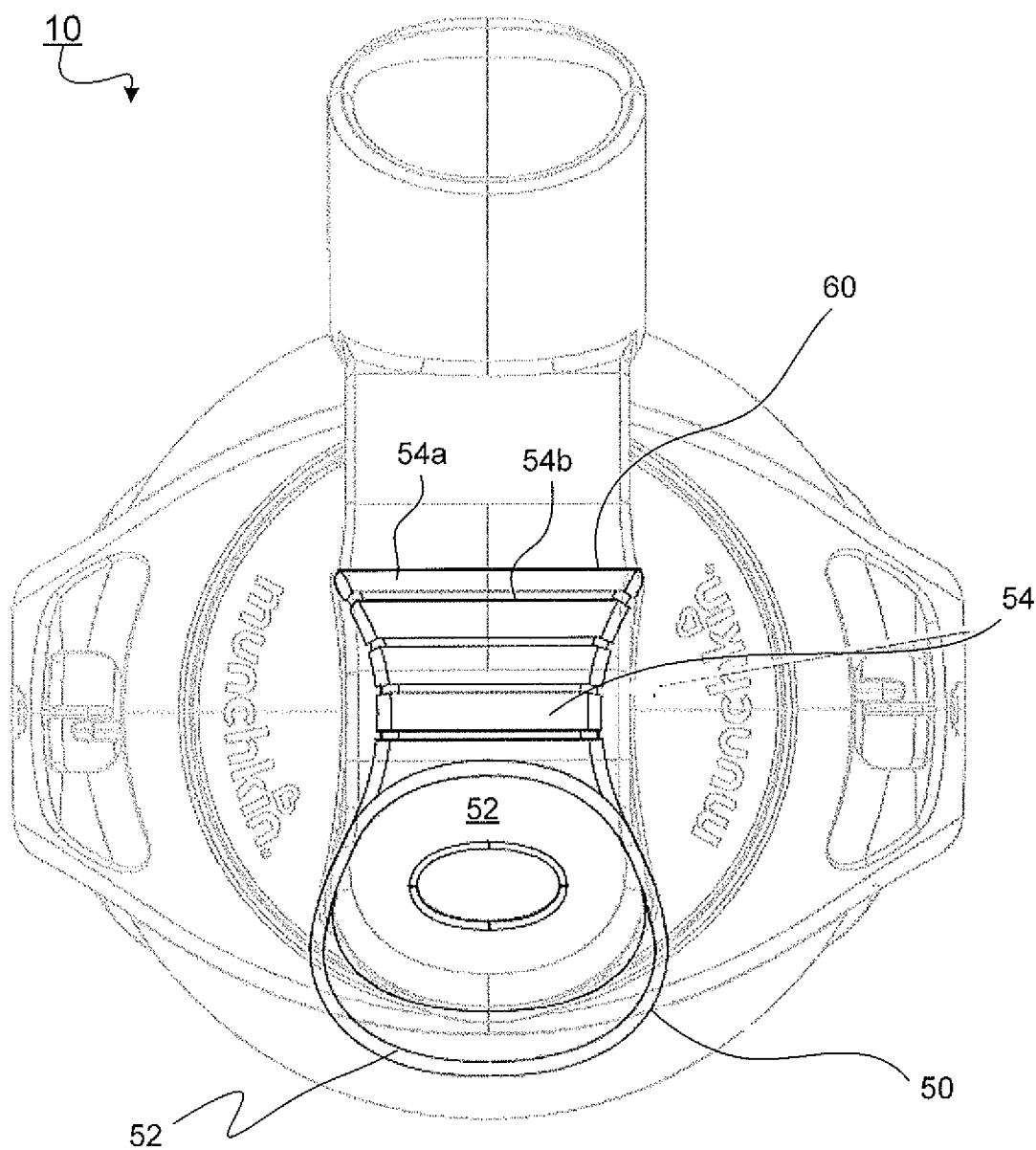
FIG. 5 shows a top view of the pivoting cover.
Figure 7:
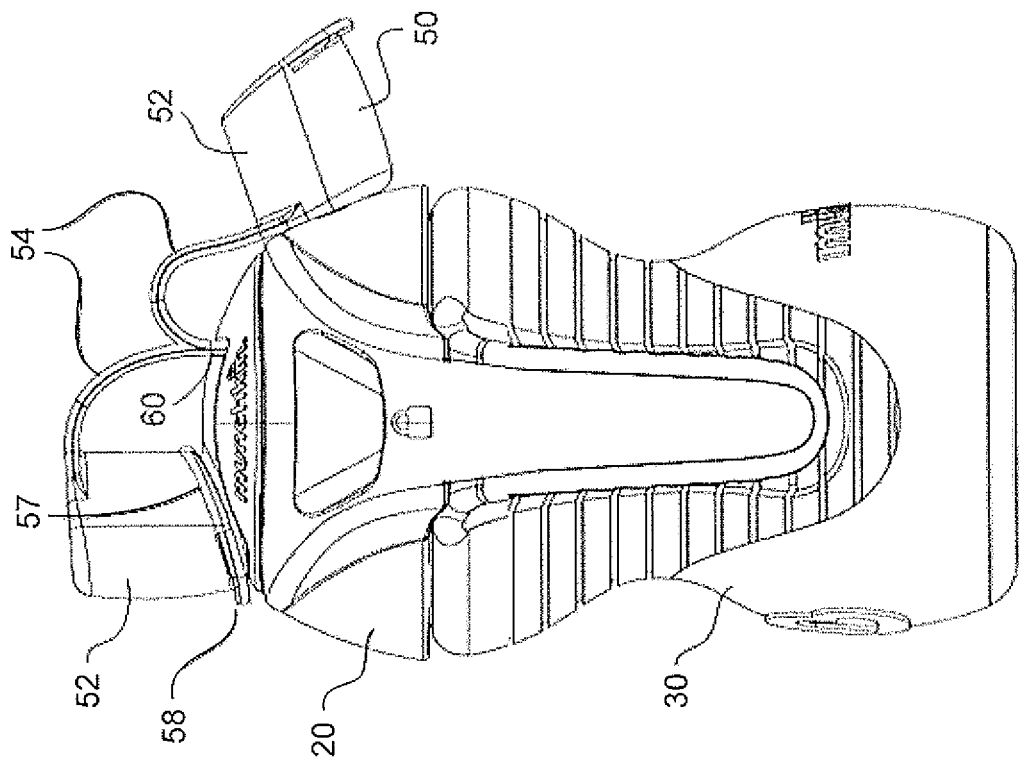
FIG. 7 illustrates another side view of the bottle.
Figure 6:
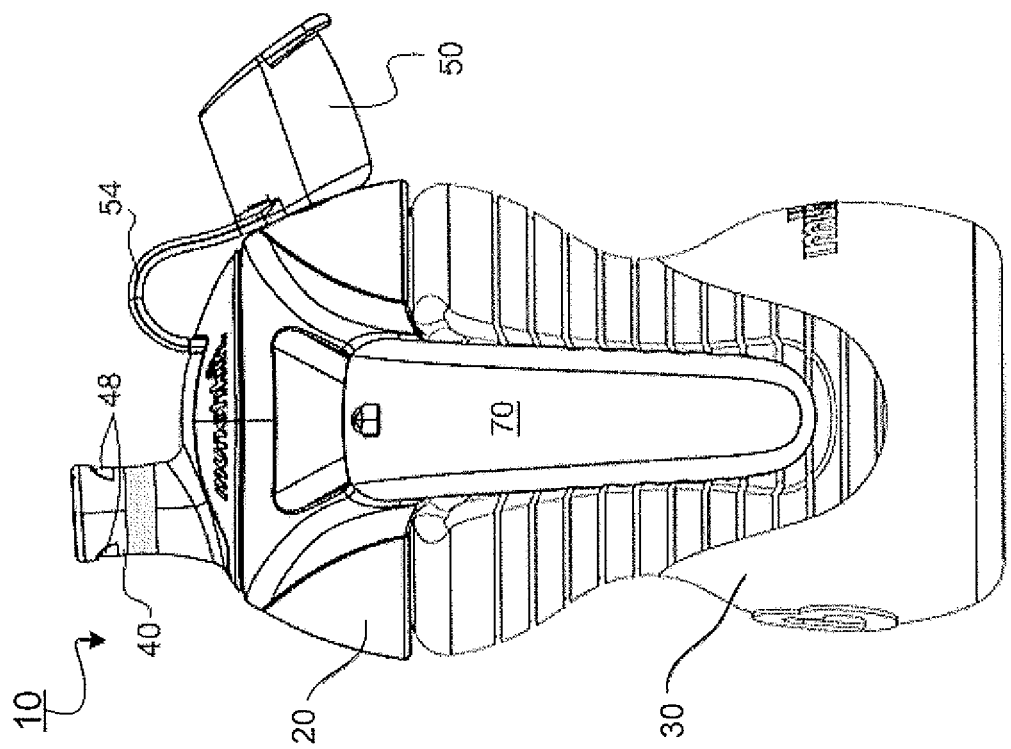
FIG. 6 depicts a side view of the bottle with handles.

FIG. 5 depicts the strap 54 having a textured inner surface comprised of raised ridges 54a and grooves 54b. Since the strap 54 has a smaller thickness at grooves 54b, the strap 54 will be more flexible and thus the cover 50 can more easily pivot about the pivoting connection 60. The raised ridges 54a also provide an increased tactile surface for the user to grip when removing the cover 50. The surface of strap 54 may be formed with a variety of patterns, shapes, thicknesses and hardness.

Furthermore, the cap portion 52 may be constructed to have a different durometer from the strap 54 in a similar method as the middle portion 46 as recited above. In the closed position, this would allow for the cap portion 52 to be harder in order to protect the spout 40 while accidentally dropped or knocked over. At the same time, constructing the strap 54 softer would allow the user to more easily manipulate the position of cover 50 from open to closed or vice versa.

Figure 8:
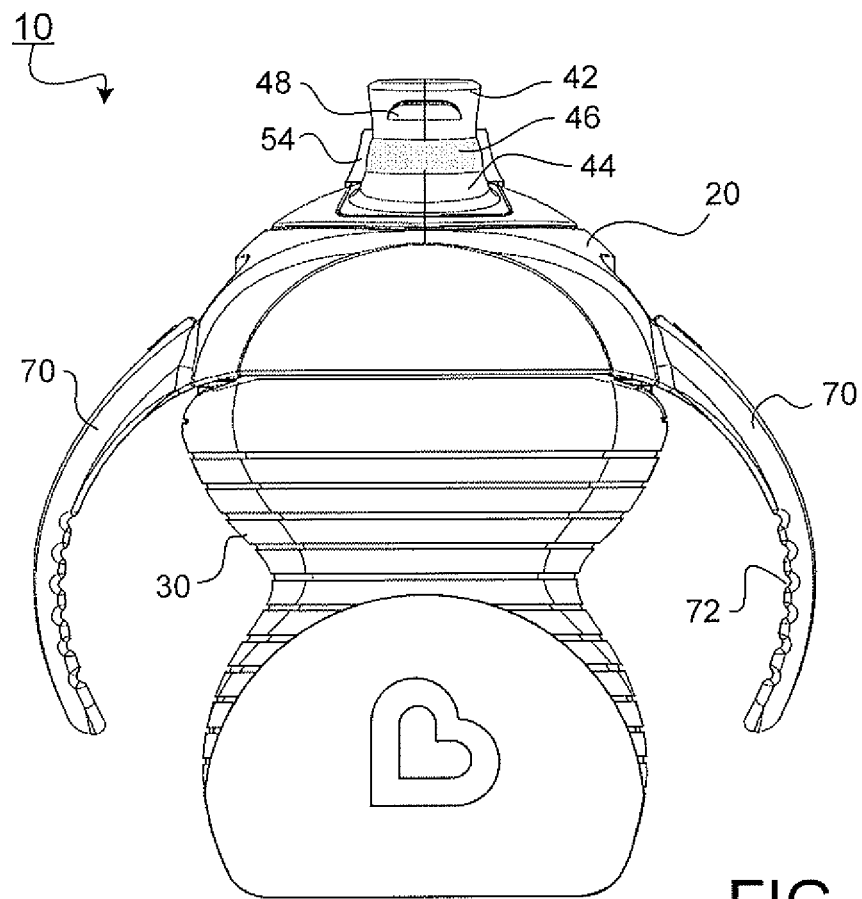
FIG. 8 shows a front view of the bottle with handles.
Figure 9:
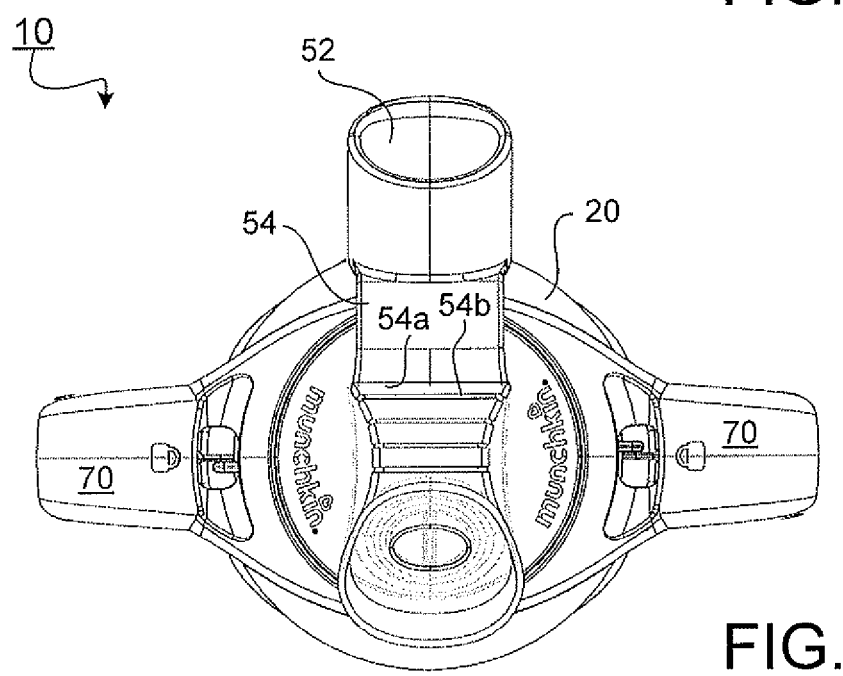
FIG. 9 depicts a top view of the bottle with handles with the pivoting cover in both the open and closed position.
Figure 10:
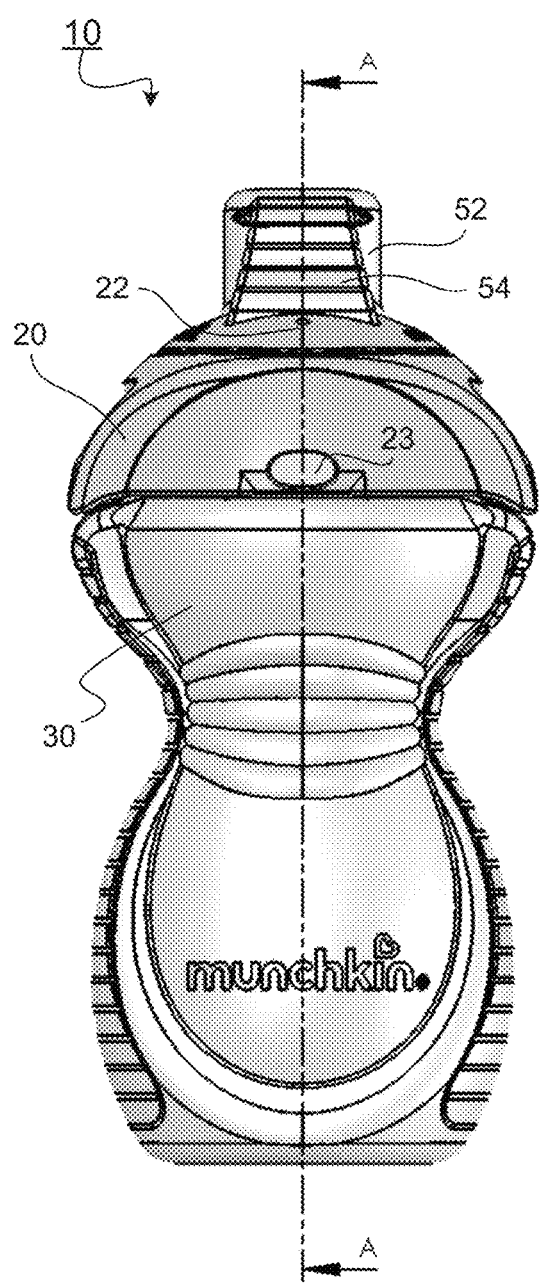
FIG. 10 illustrates a back view of the bottle with the cover in the closed position.

FIGS. 6-9 illustrate the bottle 10 further comprising handles 70 which extend out from opposing sides of the lid 20 and curve around towards a lower portion of the container 30. As shown in FIG. 8, the handles 70 may also include a multitude of grooves 72 which enhance the grip of the user. The handles 70 can take a variety of different shapes and sizes and may have different types of grips such as rubber, plastic, groves, notches, apertures, textures, or any other suitable material or device to facilitate gripping by a user.

Figure 11:
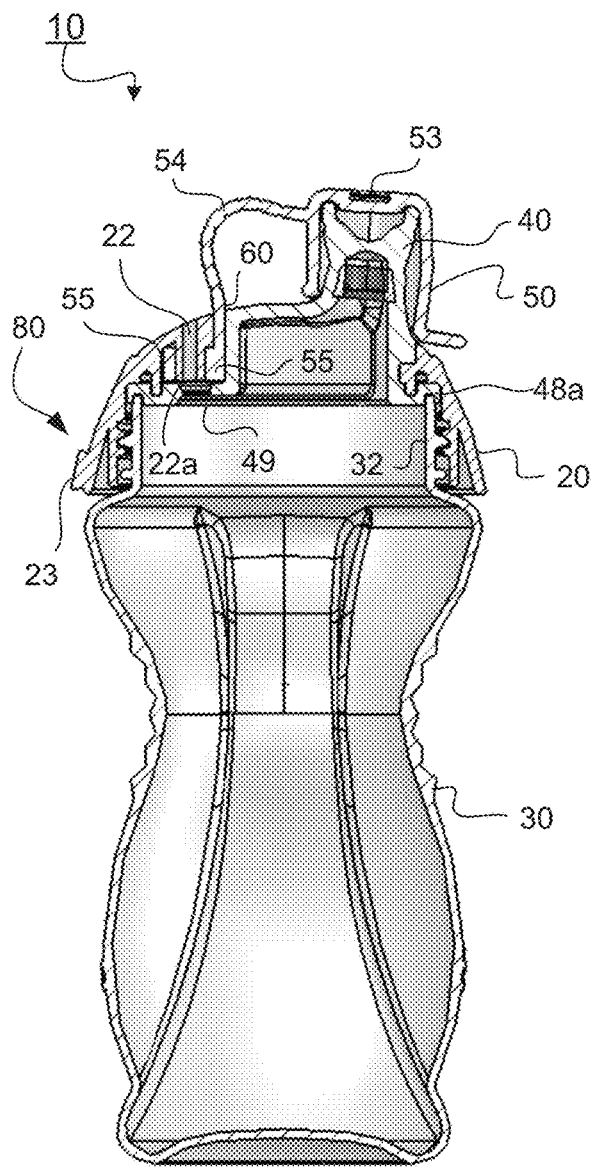
FIG. 11 shows a cross section view of the bottle about A-A in FIG. 10.

FIG. 10-13 depict the lid 20, the spout 40, the cover 50, the strap 54 and the pivoting connection 60 in greater detail. FIG. 11 illustrates a cross section of the bottle 10 about section lines A-A in FIG. 10 with the cover 50 in the closed position.

The lid 20 further comprises a ventilation shaft 22, a vent extrusion 22a and a cover attachment mechanism 80. In addition, the cover 50 further comprises a recess 53 in the cap portion 52, and a cover anchor 55 located at a second end of the strap 54, wherein the cap portion 52 is located at a first end of the strap 54. As best shown in FIG. 11, the cover anchor 55 is generally round and comprises an aperture which receives the vent extrusion 22a when the bottle 10 is assembled. However, the cover anchor 55 may take a variety of shapes and sizes suitable to mate and/or attach the cover 50 to the lid 20. This configuration keeps the cover 50 attached to the bottle 10 and allows for the strap 54 to rotate about the pivoting connection 60, while also being removable during washing. Furthermore, the cover anchor 55 may instead be attached or integral to the spout 40.

The spout 40 further comprises a horizontally extending ridge 48a and a ventilation aperture 49. When assembled, the ridge 48a rests between the lid 20 and an upper portion 32 of the container 30 and is fixed in place. The ridge 48a also acts to fix the cover anchor 55 into place between the spout 40 and the lid 20. The ventilation aperture 49 rests against a bottom of the vent extrusion 22a of the lid 20. This allows air to flow from the atmosphere, through the ventilation shaft 22 of the lid 20, the ventilation aperture 49 of the spout 40, and into the container 30.

Since the cover anchor 55 surrounds the ventilation shaft 22, both the pivoting connection 60 and the ventilation shaft 22 can be displaced by a predetermined amount from the spout 40. The ventilation shaft 22 is positioned relative to the spout 40 to permit the free flow of air into the container 30 while in use. In addition, the pivoting connection 60 is suitably positioned relative to the spout 40 so that the cover 50 may not be obstructed by the user from gripping the spout 40 with their mouth while drinking from the container 30. It is to be understood, however, that the ventilation shaft 22 may be located on different parts of the lid 20, container 30 or spout 40 as will be shown in an alternative embodiment described in FIG. 14.

Figure 12:
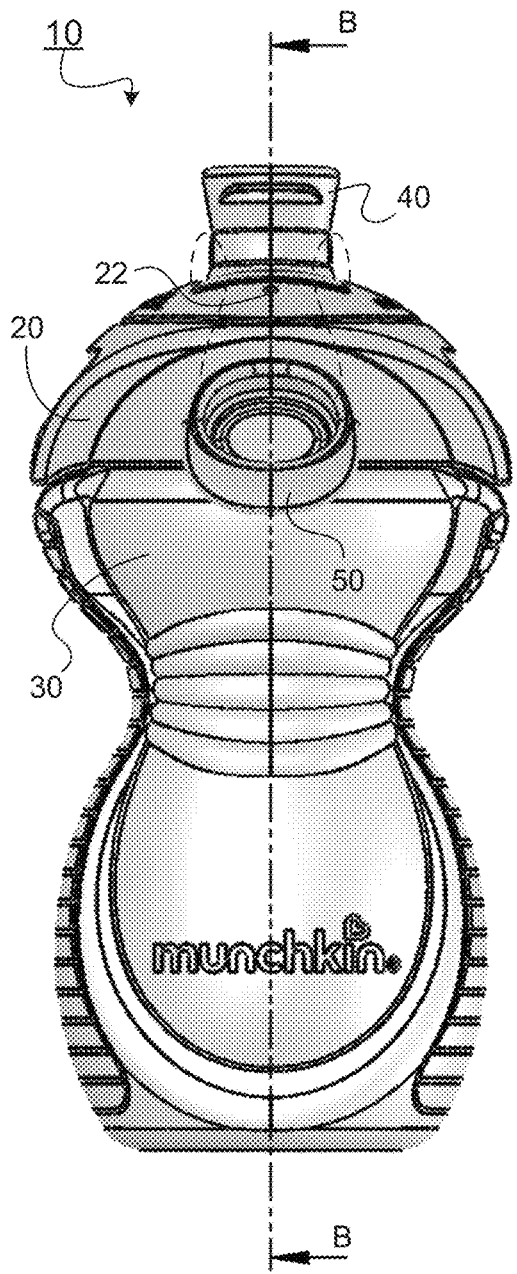
FIG. 12 depicts a back view of the bottle with the cover in the open position.
Figure 13:
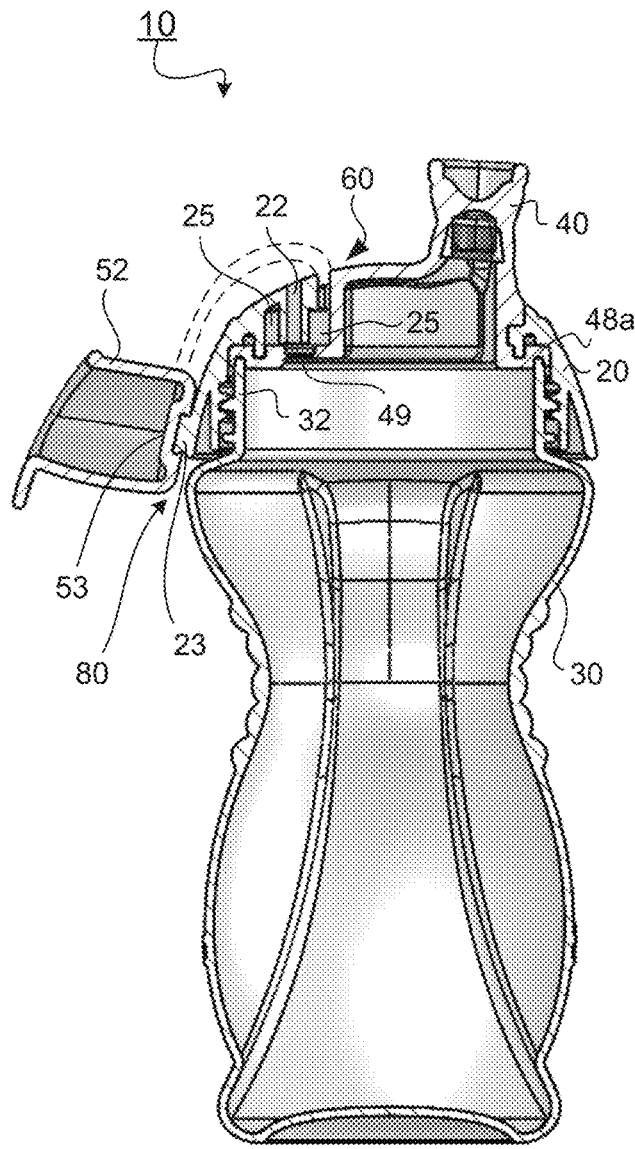
FIG. 13 illustrates a cross section view of the bottle about B-B in FIG. 12.

FIGS. 12-13 show the bottle with the strap 54 (in dashed line) and cover anchor 55 hidden. FIG. 13 illustrates a cross section of the bottle 10 about section lines B-B in FIG. 12. As shown, the lid 20 comprises an inner space 25 which surrounds the vent extrusion 22a. The inner space 25 is adapted to receive the cover anchor 55 when assembled and fixes the cover anchor 55 in place between the lid 20 and the spout 40.

The cover attachment mechanism 80 is shown in more detail in FIG. 13. The recess 53 in the cover 50 has a resilient undercut which slightly flexes as it is pushed onto the cover attachment point 23. The recess 53 flexes back into its original configuration when installed into the open position, thereby gripping the cover attachment point 23 of the lid 20 and preventing the cover 50 from flipping back into the closed position or any other position while the user is drinking from the bottle 10. It is to be understood that the cover attachment mechanism 80 can take a variety of forms, including Velcro®, snap, hook and loop, slip-fit, button, or magnets fasteners, or any other suitable coupling mechanism.

Figure 14:
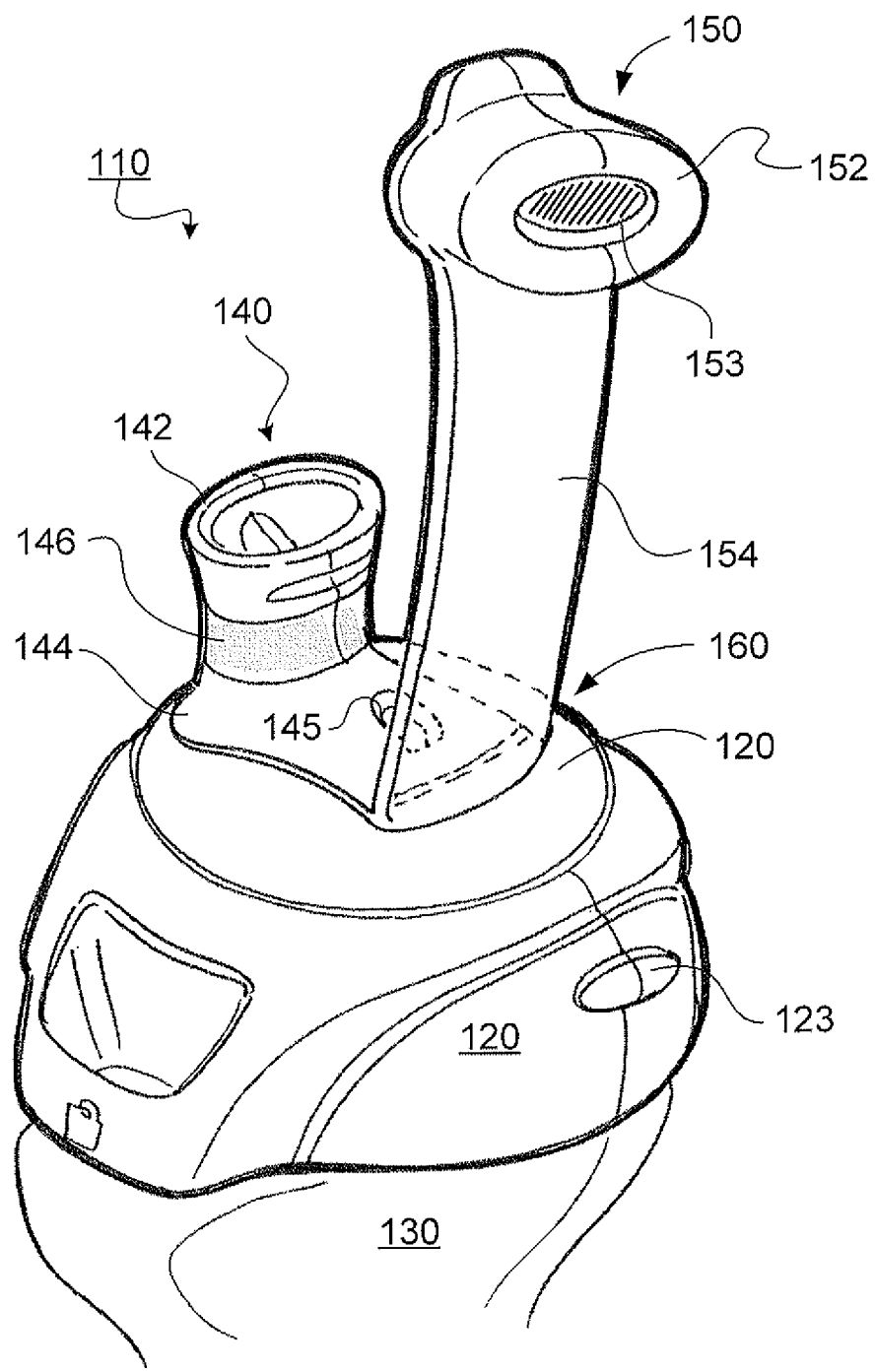
FIG. 14 shows a back perspective view of a bite proof bottle with a pivoting cover having another exemplary spout and lid according to the subject disclosure.
Figure 16:
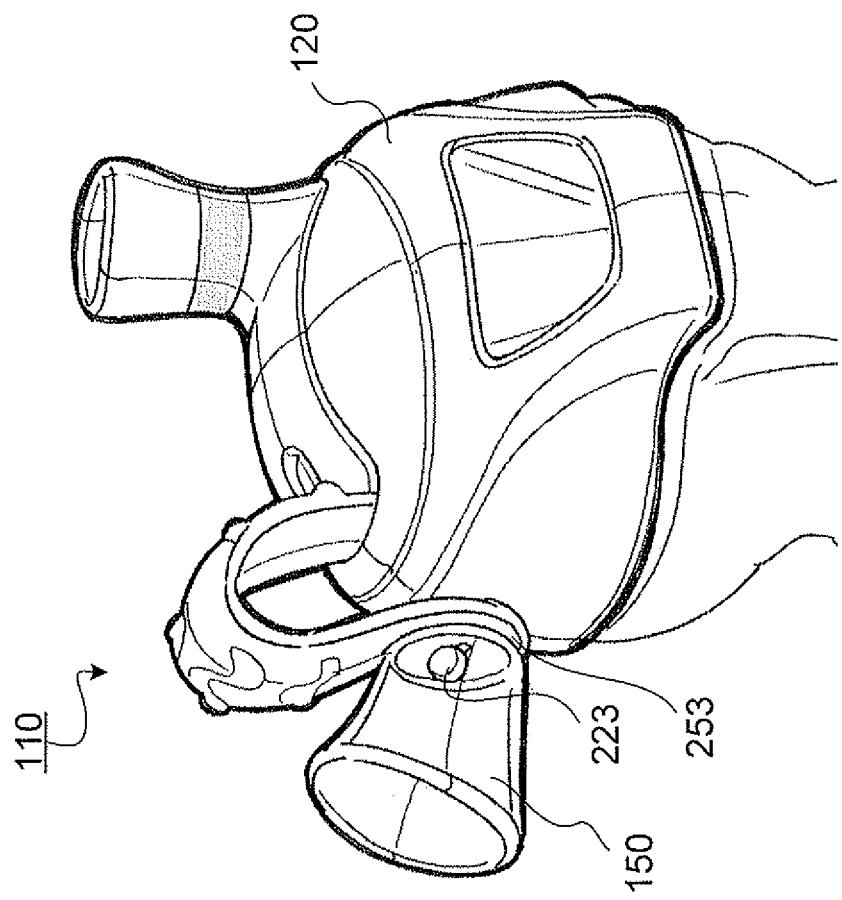
FIG. 16 illustrates a side perspective view of the bottle with the cover in the open position.
Figure 15:
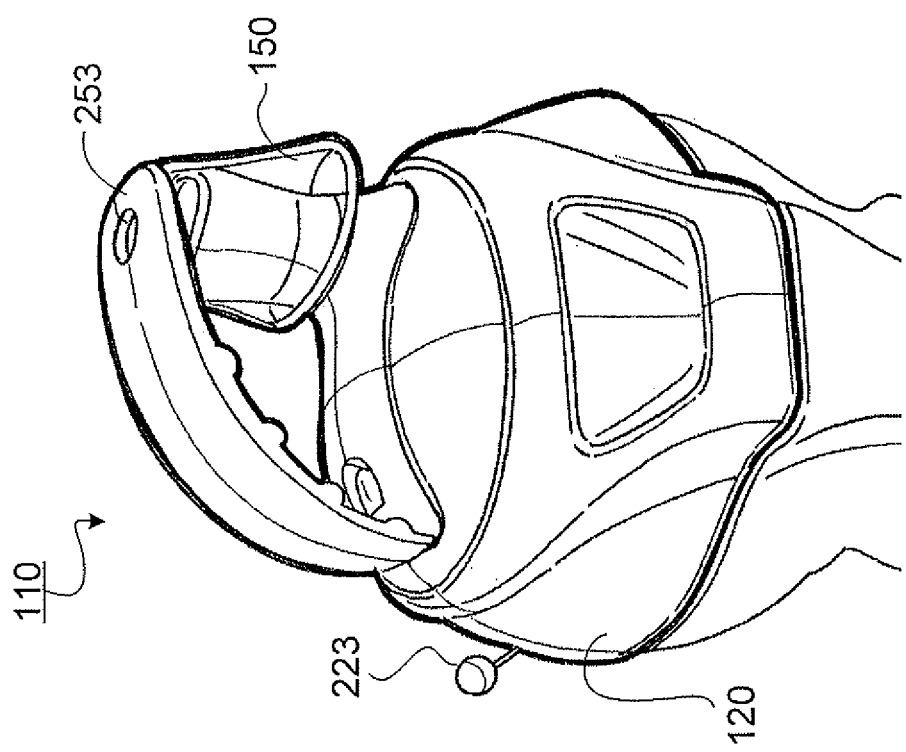
FIG. 15 depicts a side perspective view of the bottle with the cover in the closed position.
Figure 17:
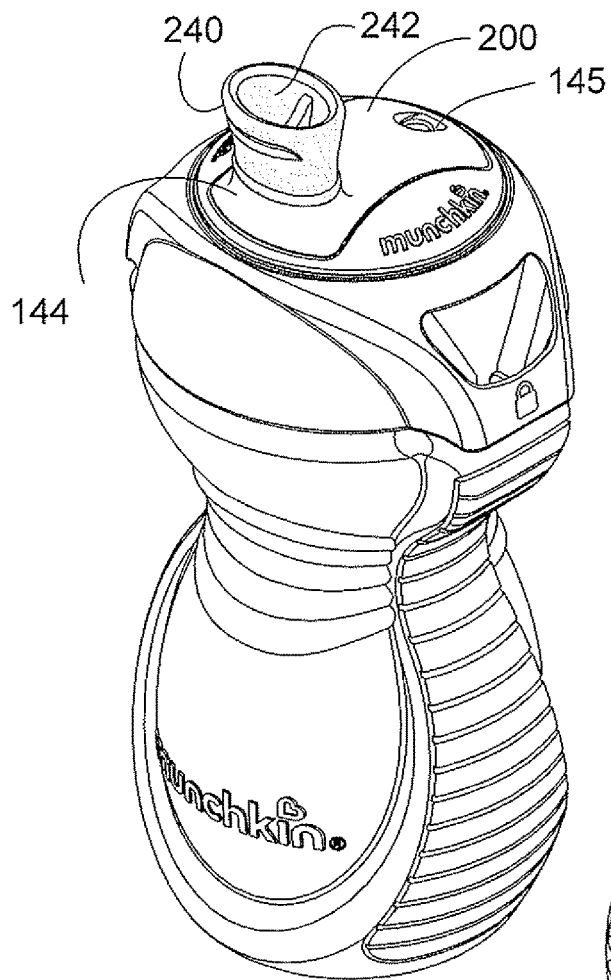
FIG. 17 shows an upper perspective view of a bottle having a bite proof spout according to the subject disclosure.
Figure 18:
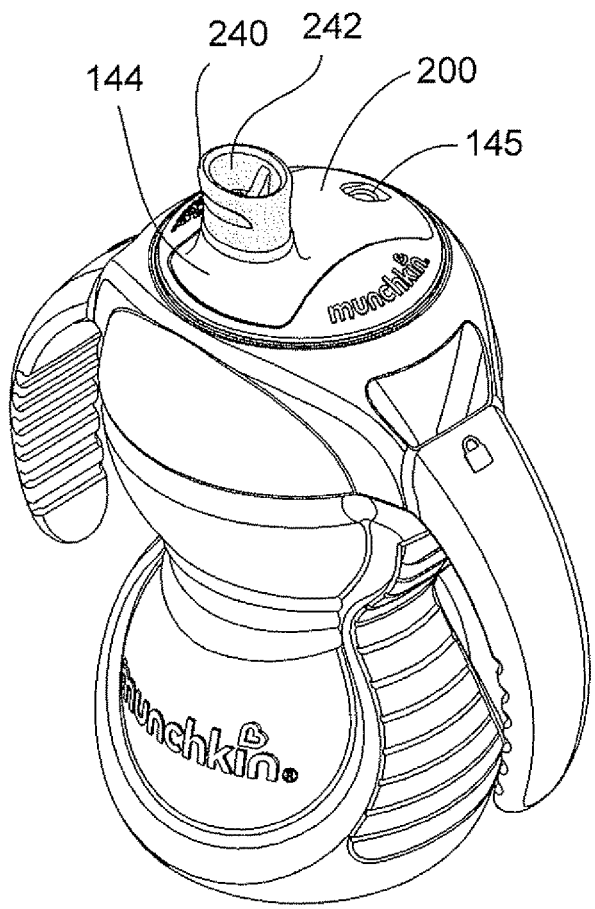
FIG. 18 depicts another upper perspective view of a bottle having a bite proof spout.
Figure 19:
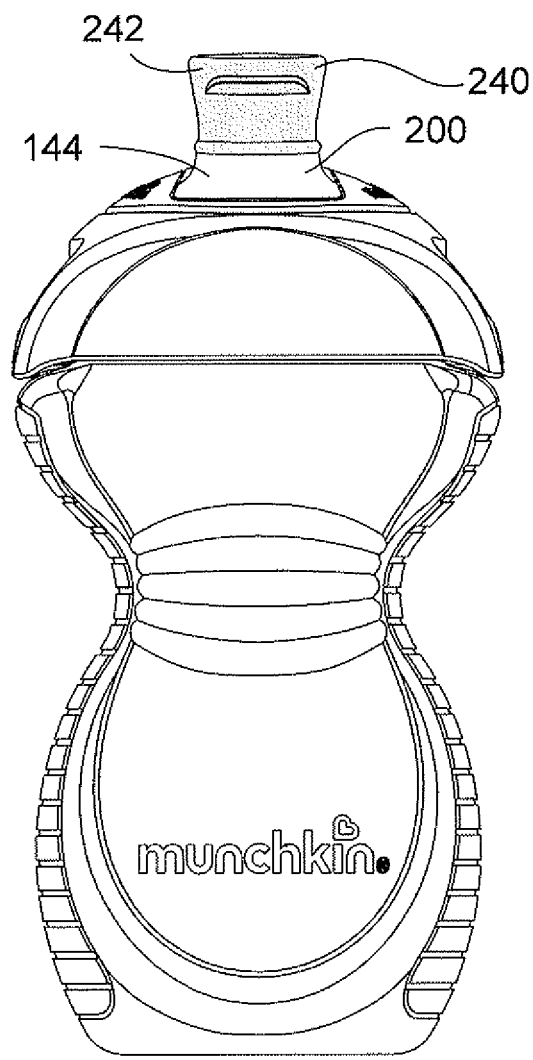
FIGS. 19-20 show a front and side view of the bottle having a bite proof spout.
Figure 20:
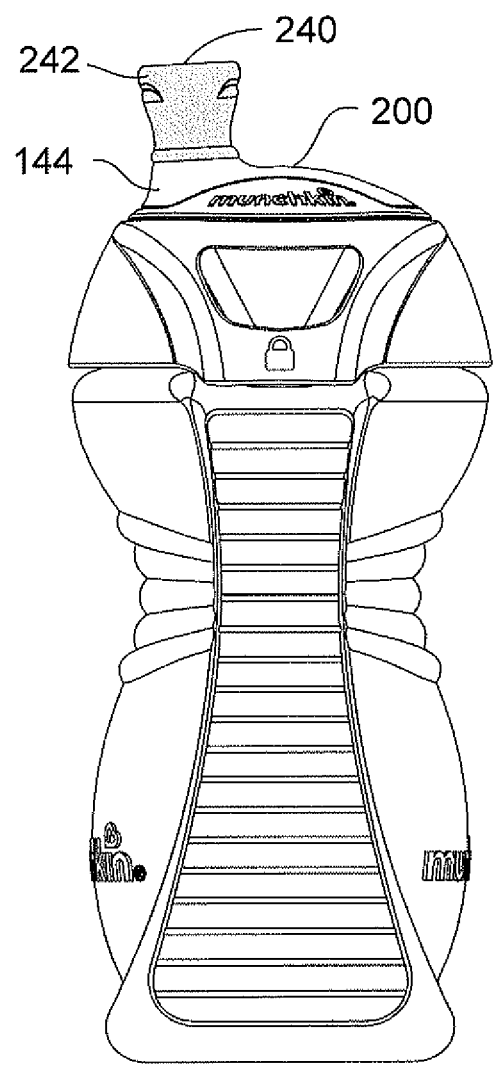
Figure 21:
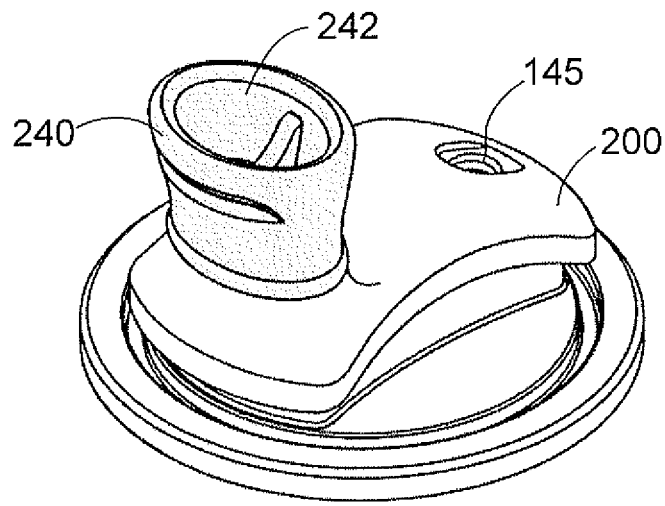
FIG. 21 illustrates an upper perspective view of a soft top insert having a bite proof spout.
Figure 22:
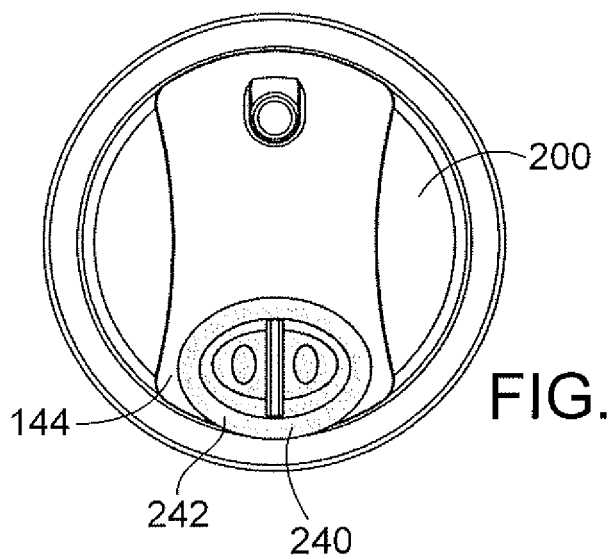
FIG. 22 depicts a top view of the soft top insert having the bite proof spout.
Figure 23:
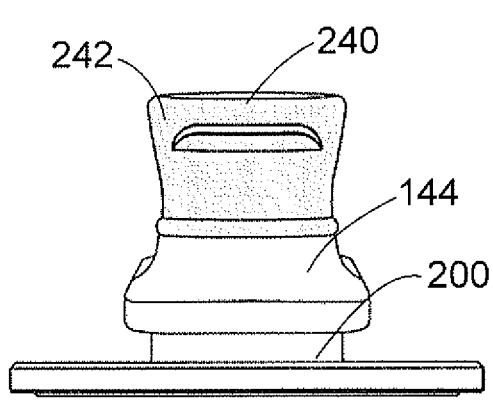
FIG. 23 shows a front view of the soft top insert having the bite proof spout.
Figure 24:
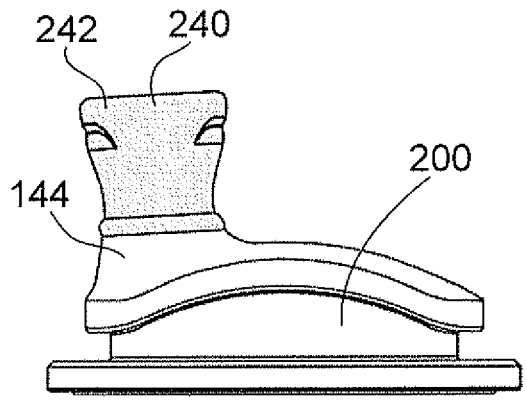
FIG. 24 shows a side views of the soft top insert having the bite proof spout.

FIG. 14 shows a back perspective view of a bite proof bottle 110 with a pivoting cover 150 having another exemplary spout 140 and lid 120 according to the subject disclosure. As shown in FIGS. 14-16, the cover 150 includes a cap portion 152 and a strap 154 which connects to the lid 120 at a pivoting connection 160. The cap portion 152 also includes a recess 153 which receives a complementary cover attachment point 123 on the lid 120. FIGS. 15-16 show another method to attach the cover 153 to the lid 120 which uses an integrated pin 223 connection which fits into an aperture 253 located within the cover 150

FIG. 14 shows the spout 140 comprising a top portion 142, bottom portion 144, middle portion 146 and a vent 145. Here, the strap 154 is attached between the spout 140 and the lid 120 in a separate position away from the vent 145. The vent 145 communicates air from the atmosphere directly into a container 130. The middle portion 146 may be constructed to have similar features of the middle portion 46 as recited above.

FIGS. 17-26 show another briefly mentioned above process in which an upper portion 242 of a soft top insert 200 may be constructed to include the previous mentioned top portion 42 and the middle band 46 of a single material composition defining the spout 240. That is, the spout 240 may be made of a harder first material composition of a first harder durometer (such as in the range of 60), and the second softer lower region 144 may be made of a softer second material composition comprised of a softer durometer (such as in the range of 50).

As will be described in more detail later, the spout 240 may be formed of, and fastened to, the softer lower region 144 of the soft top insert 200 via a compression molding technique and/or any other suitable technique capable of fastening a spout of a first durometer to a lower base portion of a soft top insert which is composed of a different second durometer composition.

FIGS. 21-24 illustrate various exemplary views of the soft top insert 200 including the spout 240 having a single material consistency of a first durometer and a lower region 144 having a single material consistency of a second durometer being softer than the spout 240.

Figure 25:
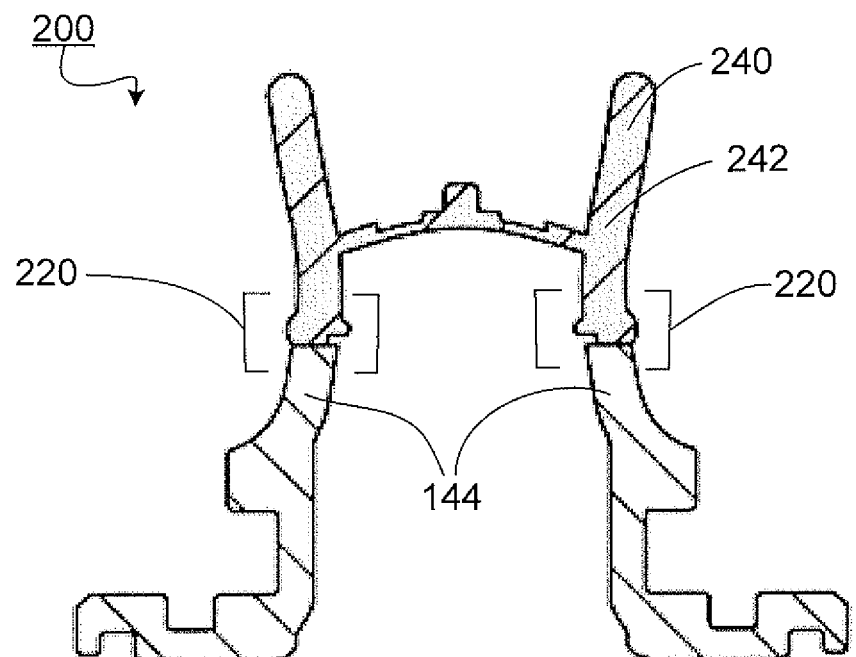
FIG. 25 illustrates a front cross section view of the soft top insert having the bite proof spout.
Figure 26:
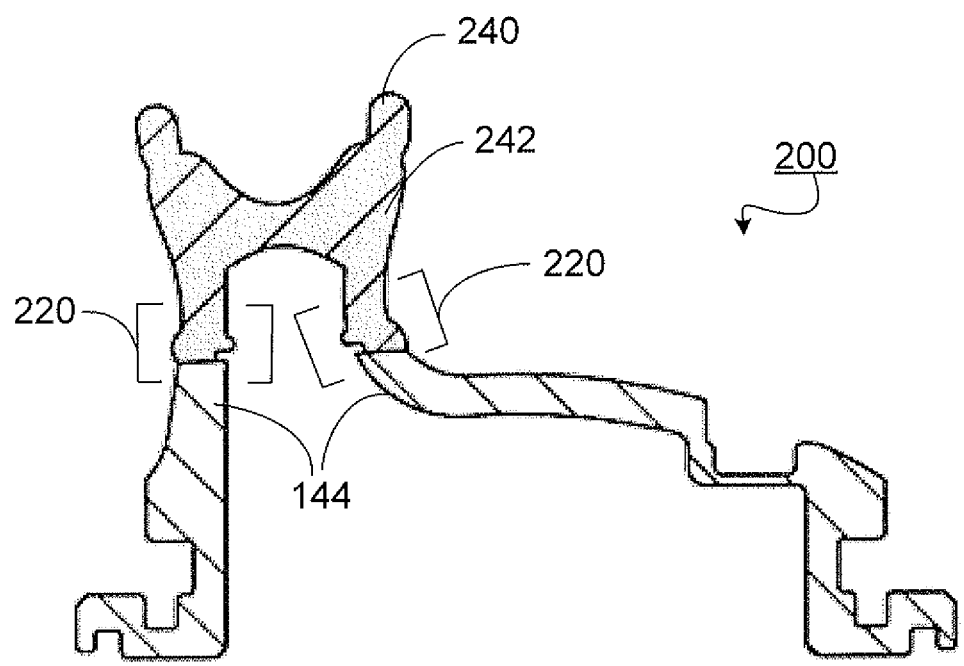
FIG. 26 illustrates a side cross section view of the soft top insert having the bite proof spout.

FIGS. 25-26 depict front and side cross section views of the spout soft top insert 200 including the spout 240 connected to the lower region 144. As shown, various contours may be constructed into the region adjacent to the connection between the spout 240 and the lower region 144 for a variety of different purposes. For example, various concentric bumps or ridges can be configured to create a connecting lap-joint between the between the spout 240 and the upper end of the lower region 144. Alternatively, a channel 220 can be constructed adjacent to the spout 240 and the upper end of the lower region 144 in order to provide a flow area to allow for trapped gasses during the compression molding process to escape. A plurality of different configurations is possible at this juncture between the spout 240 and the upper end of the lower region 144.

FIGS. 27-35 illustrate an exemplary process for constructing the soft top insert, and would be a compression molding process in which one tool uses two different molds. A first mold would be used to construct the spout tip and a second mold may be used for an overmold process to connect the spout tip to the lower portion of the soft top insert.

Figure 27:
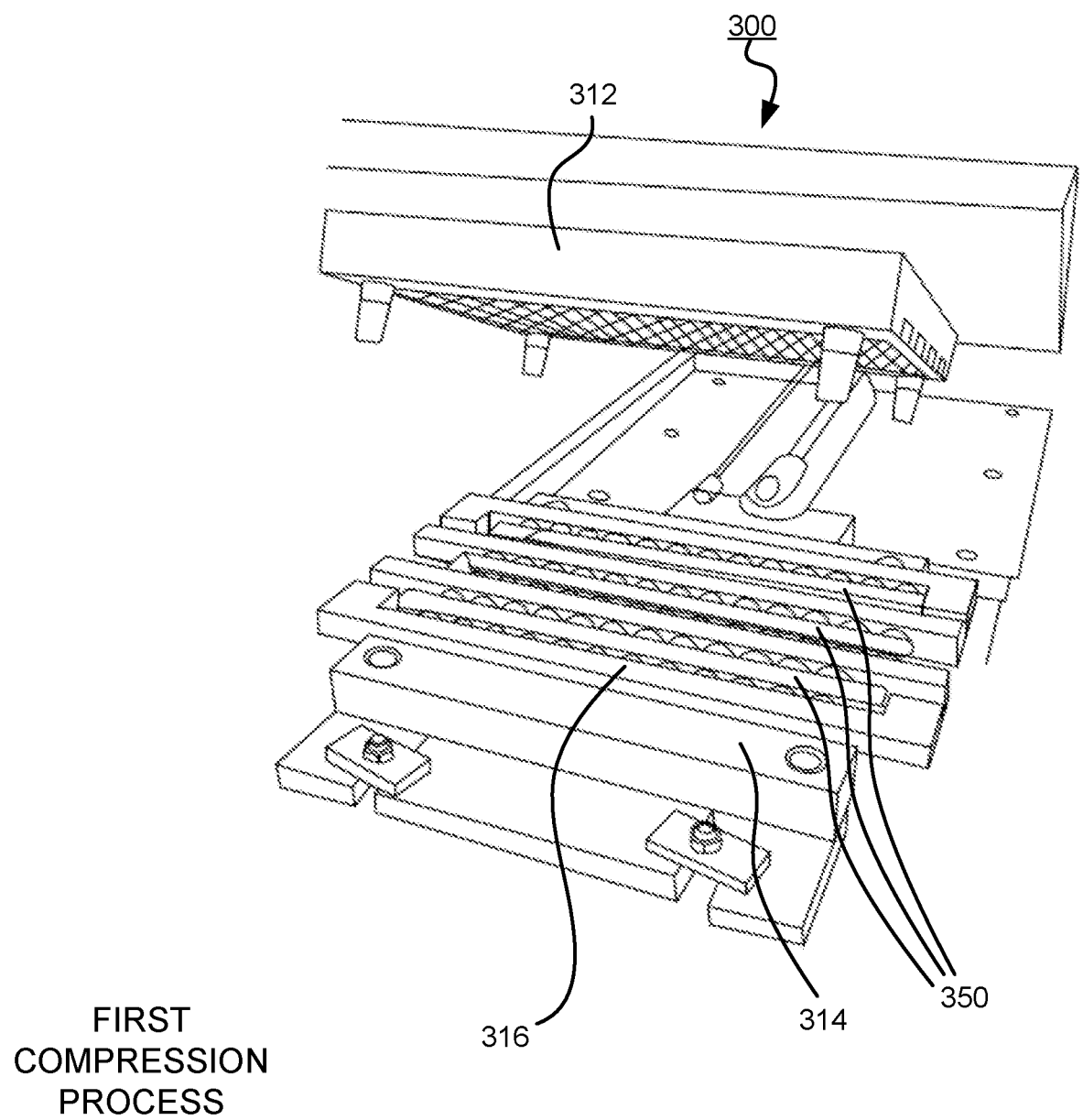
FIGS. 27-35 illustrate an exemplary process of making the soft top insert with the bite proof spout.

In a first step as shown in FIG. 27, the spout tip is processed using molding tool 300. A first material composition 350, such as a suitable silicon, is placed between an upper 312 and a lower 314 mold adjacent to a removable insert or core 316. The first composition is placed over the removable core 316 and adjacent to the various cavities adapted to receive the molten composition to form the various spout tips. By way of example shown in FIG. 27, slabs of 60 durometer silicone may be placed over the removable insert or core 316. The removable core 316 can be a single piece core or a modular core that is assembled with various component parts. As shown in FIG. 27, the various component parts of the removable core stack adjacent to each other, forming the recess structure that will define the shape of the spout between the upper 312 and lower 314 molds.

In the first step process, the removable core 316 is aligned within the upper 312 and lower 314 molds and the various spouts are formed by a first compression molding process in which the molding material is generally preheated, and is placed in the open, heated mold cavity defined by the upper 312 and lower 314 molds and the inner removable core 316. The mold is closed with a predetermined force, and pressure is applied to force the mold material 350 into contact with all mold areas, while heat and pressure are maintained until the molding material has cured to form the shape of the spouts. Following the spout molding process, the spout may undergo a curing process at a predetermined heat and duration of time.

The advantage of compression molding is its ability to mold fairly intricate parts. It is also one of the lowest cost molding methods. However, it is to be understood that other methods for molding the spout may be employed, such as but not limited to other methods such as transfer molding and injection molding.

Figure 28:
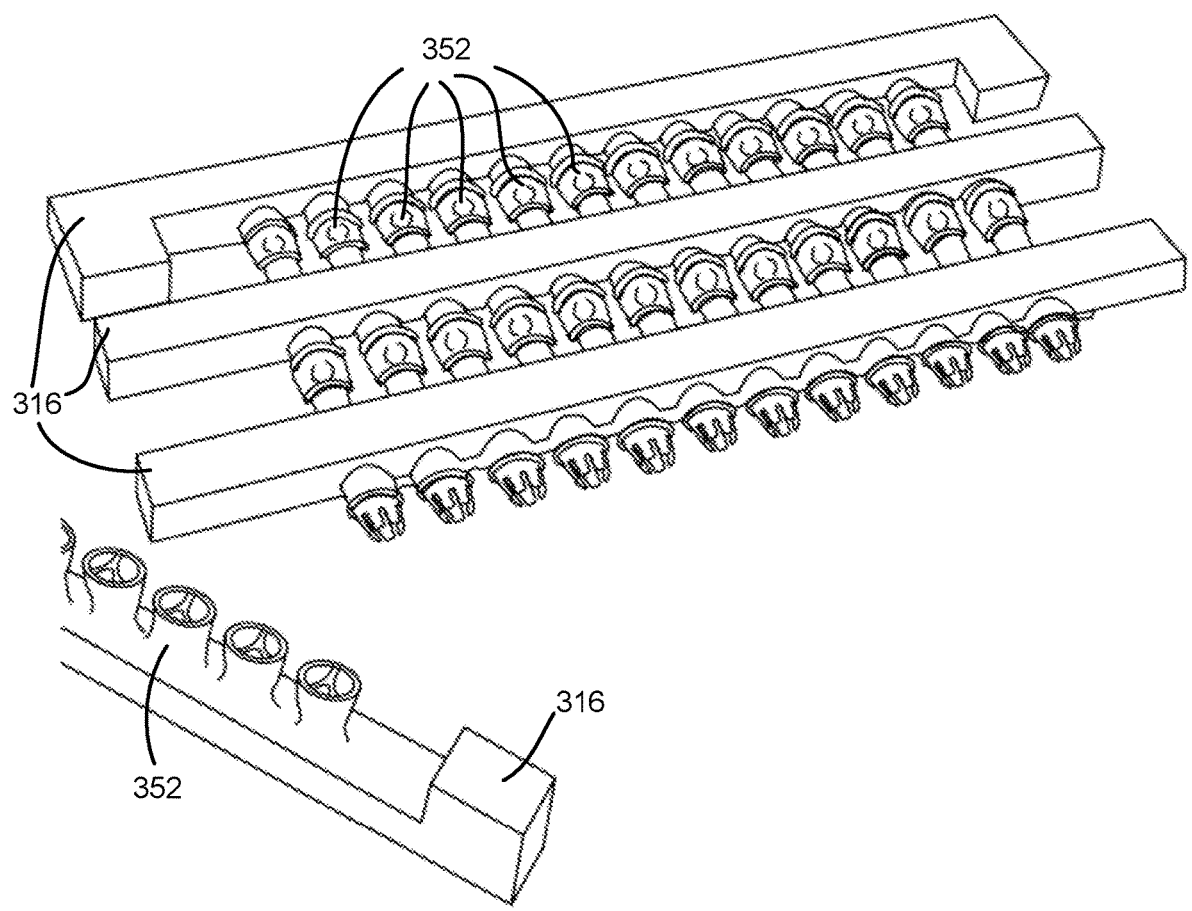
Figure 29:
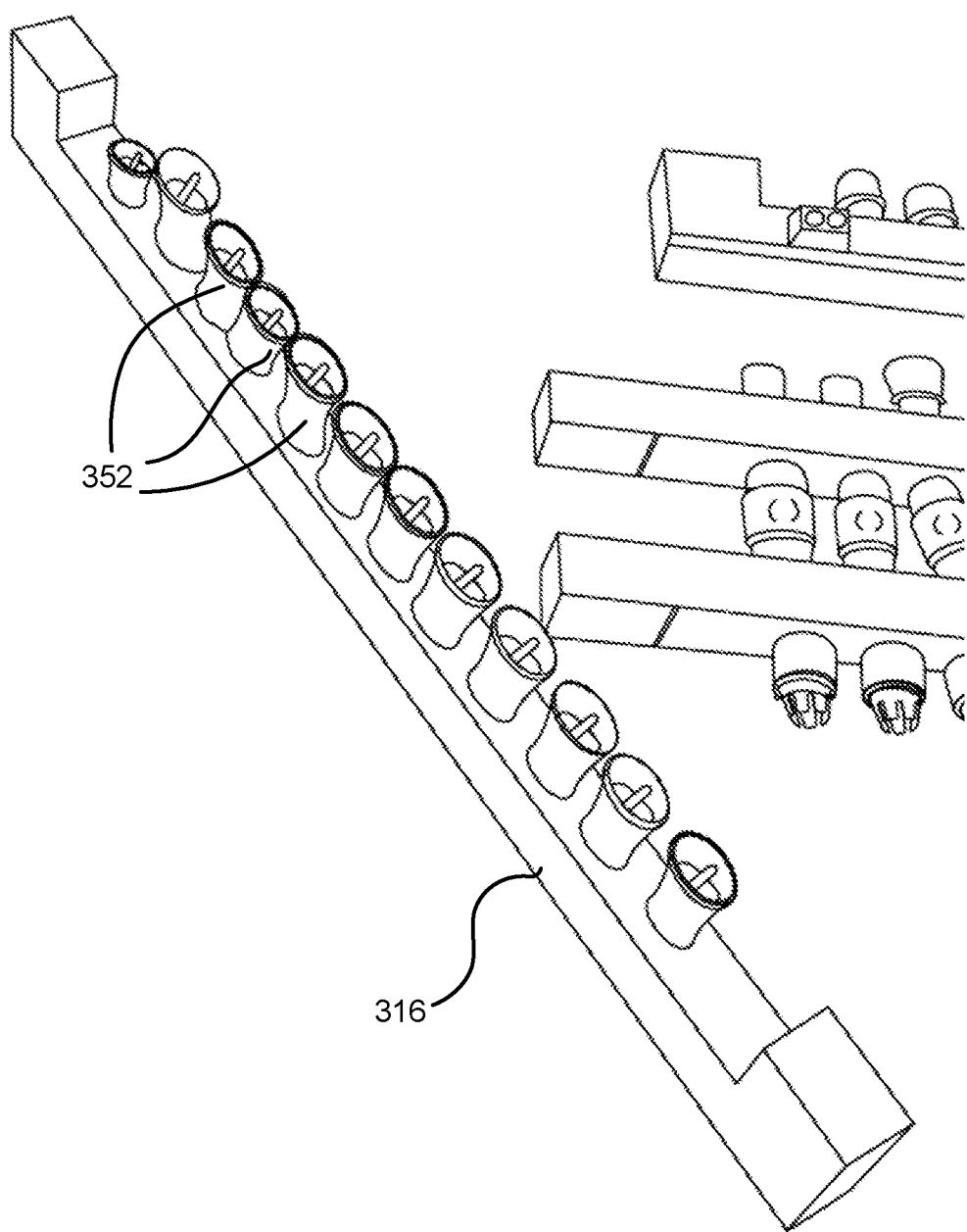

In a second step as shown in FIG. 28, the individual spouts are shown attached to the removable core which has been removed from the upper 312 and lower 314 molds. Also shown, the individual spouts 352 may be removed as rows of spouts from the removable core 316. As shown in FIG. 29, various individual components of the removable core 316 may then modularly separated from each other so that each of the individually molded spout tips 352 may be accessed and removed from the removable internal core 316. Any extraneous flashing may be cleaned off, or removed from the individual spouts.

Figure 30:
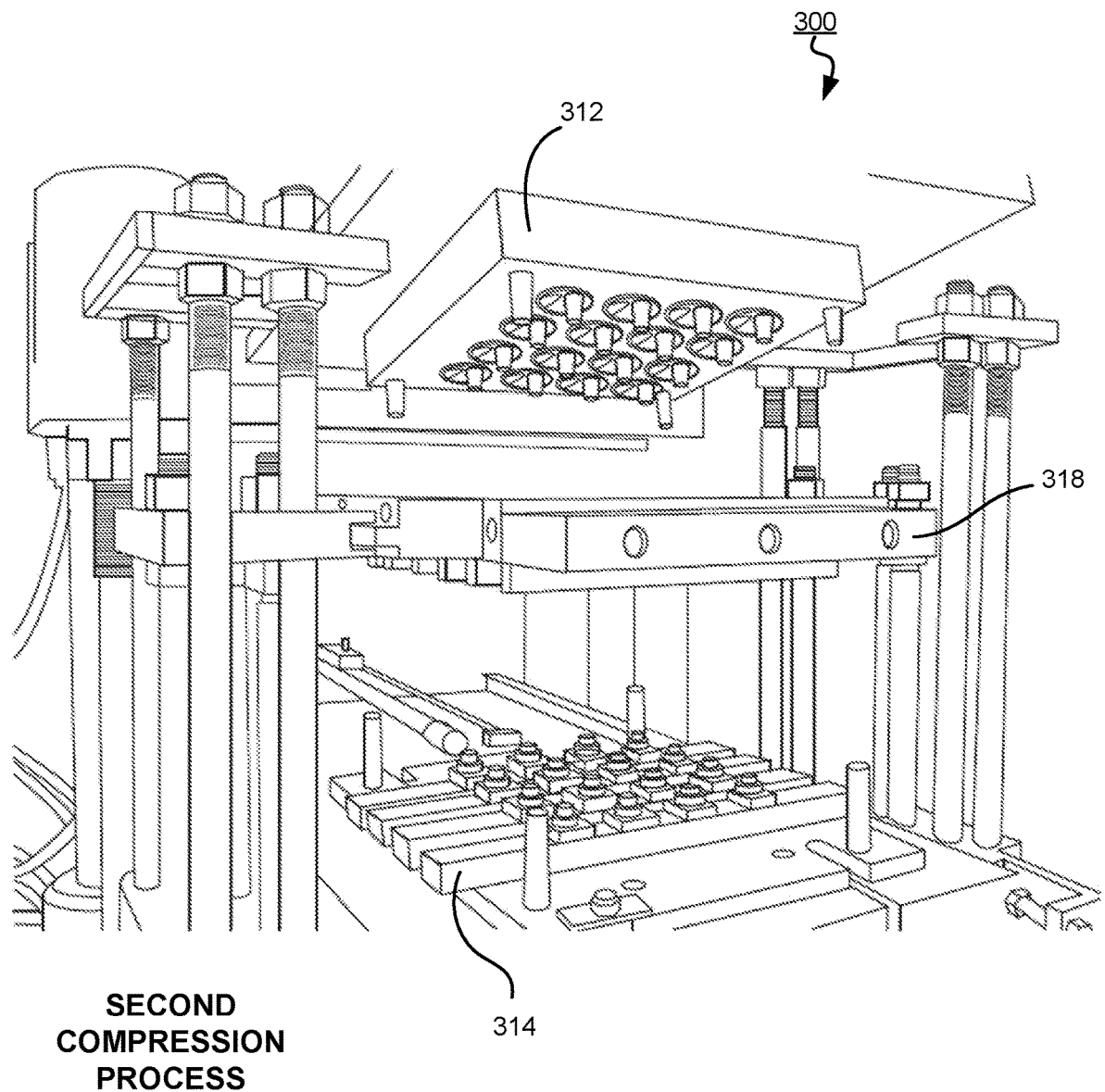

FIG. 30 shows another step in which the molds for the first spout mold have been removed and the molds for the second process are put in place in the compression mold tooling. In the second overmold process, the spout mold is over molded with another mold material of a second durometer.

Figure 31:
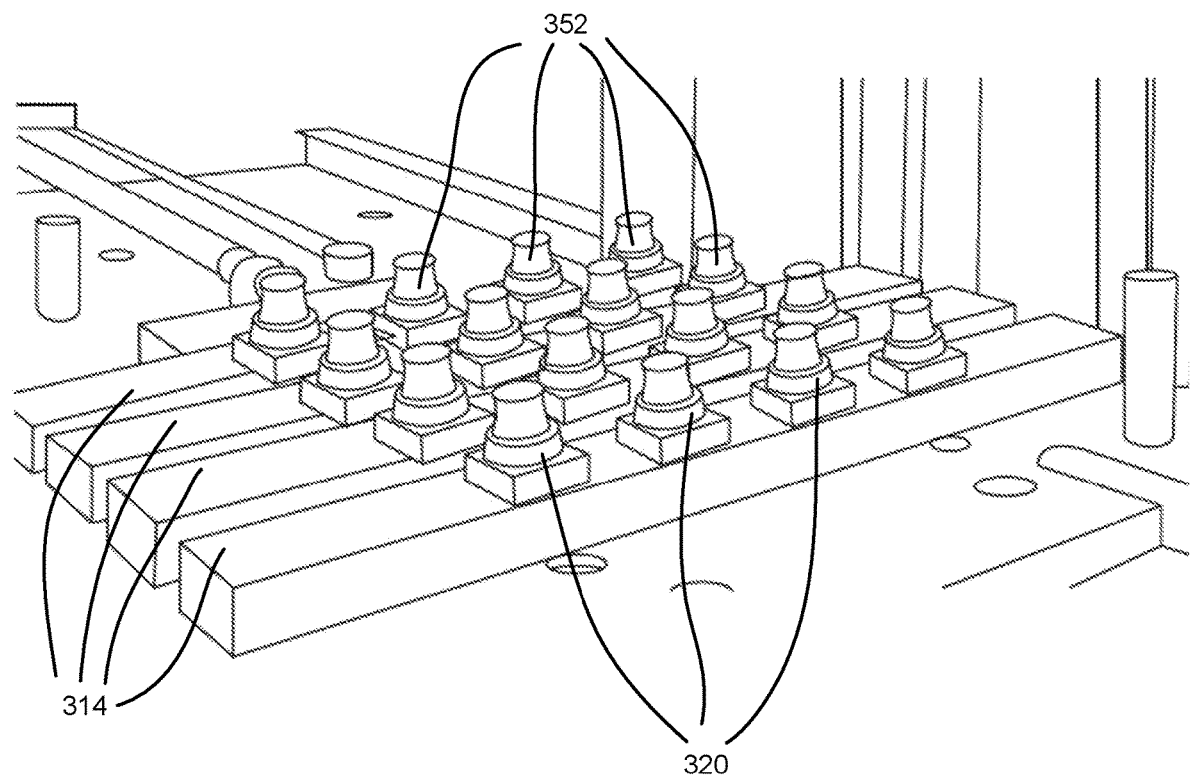
Figure 32:
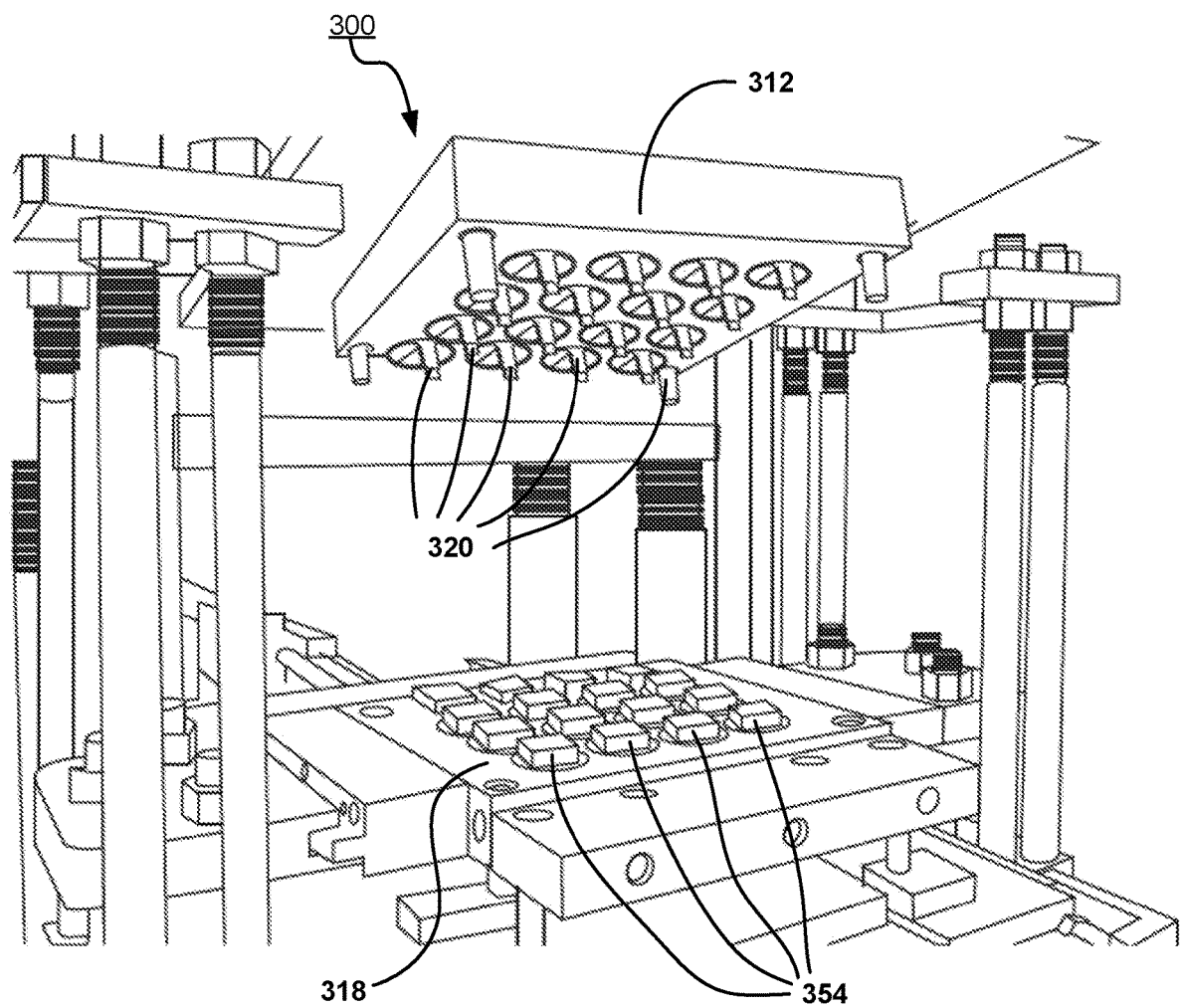

In this step, the overmold has a mold comprised of three layers. As shown in FIGS. 30-31, the molded spout tips 352 are placed upside down onto mating projections 320 on the bottom most lower layer 314 of the mold. In a next step, the middle layer mold 318 is aligned and lowered over the first lower layer 314 holding the molded spout tips 352. The middle layer 318 includes an internal mold recess adapted to be configured to the outer shape of the soft top insert. When the upper third layer 312 is closed over the second and first layers, an internal shape forming the soft top insert is constructed between the first 314, middle 318 and upper 312 molds and overmolded or melted onto the preformed spout tip.

Referring back to FIG. 32, a second mold material 354 of a predetermined quantity of a second softer durometer material is placed over the internal mold recess above the middle layer 318. For example, predetermined quantities of slabs of 50 durometer silicon may be positioned adjacent to various recessed defined in the middle layer 318 of the mold to form the lower portion of the soft top insert.

Figure 33:
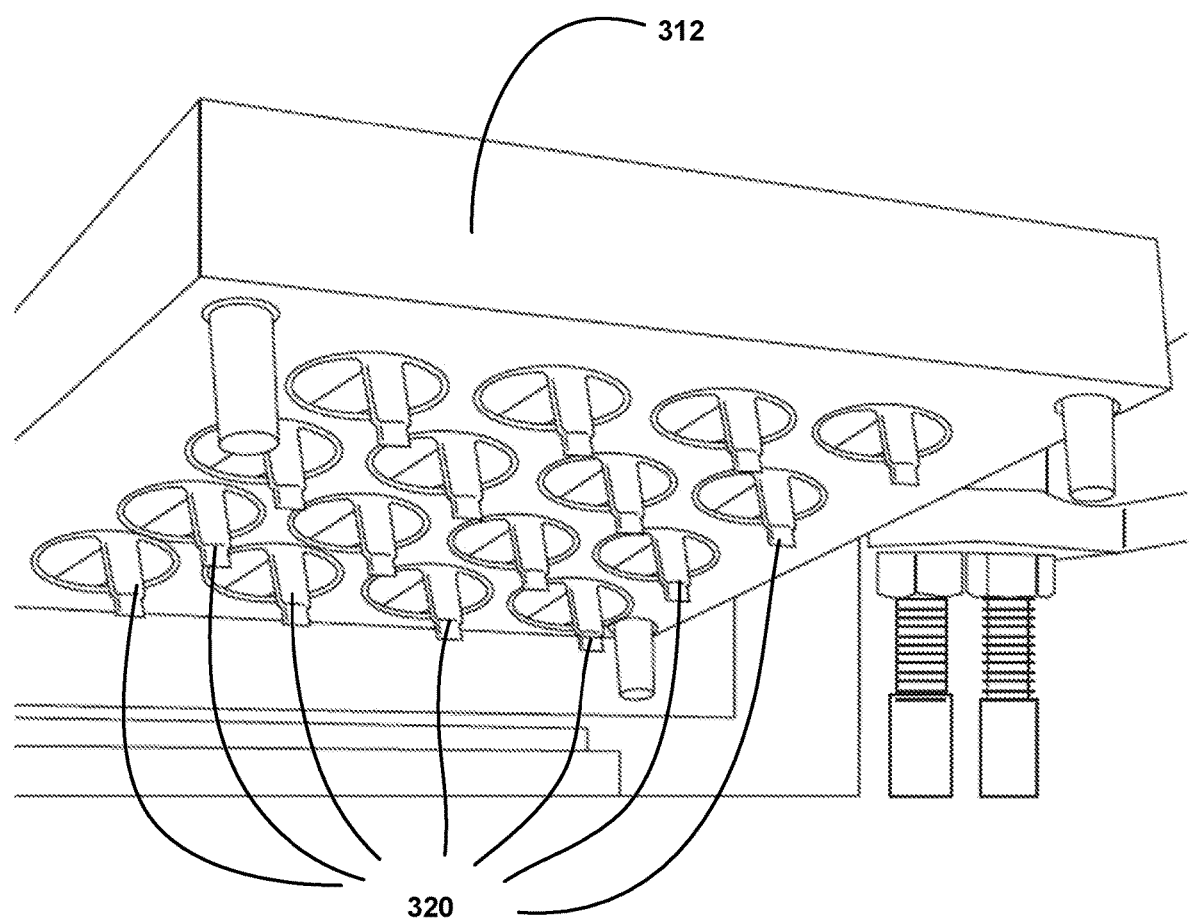

As shown in FIG. 33, the lower face of the upper mold 312 includes at least one projection 320 defining a negative construction of the internal surface area of the soft top insert. When the upper mold layer 312 is compressed against the second middle layer mold 318, the projections 320 on the lower face of the upper mold 312 defines the inner construction of the soft top insert. During the compression process, the upper 312, middle 318 and lower 314 mold layers closed against each other under high pressure and heat defining the configuration of the soft top insert and it being overmolded onto the hardened spout tip 352. That is, the top mold layer 312 compresses onto the middle mold layer 318 and finally onto the lower mold layer 314 of the mold. This compression forms the bottom portion of the soft top insert and causes the bottom of the spout to overmold onto the spout tip. Thereafter, the complete soft top insert may be processed through a subsequent curing procedure. Since the spout tip of a first durometer has been cured, it is possible to form a clean secure bond connection against the upper connecting surface of the lower region of the soft top insert.

Various techniques may be implemented to create a secure connection between the spout tip and the upper portion of the lower region of the soft top insert below the spout tip, such as by providing a lap-joint or other suitable interlocking structure there-between according to this subject disclosure. Other alignment and position fastening techniques may be employed to ensure that the position of the spout tip adjacent to the lower layer mold will not shift from its axial alignment during the compression process such as by forming ridges or joints to keep the spout in a predetermined position during the compression process. See for example the various ridges and bumps 220 integrated onto the spout as shown in FIGS. 25-26 at the junction adjacent to the spout tip 240 and the lower region 144 of the soft top insert 200.

Likewise, various other processes may be implemented to bond the spout tip of a first durometer to a lower region of a soft top insert. For example, instead of a two step process, both the spout tip of a first durometer and the lower region of the soft top insert may be formed in a single compression process. Furthermore, other manufacturing processes may be employed, including but not limited to for example, a first or second stage compression molding process, an injection molding process, or other suitable process capable of securely bonding a spout tip of a first durometer to a lower region of a soft top insert of a second durometer. Various different suitable durometers may be used according to this subject disclosure.

Figure 34:
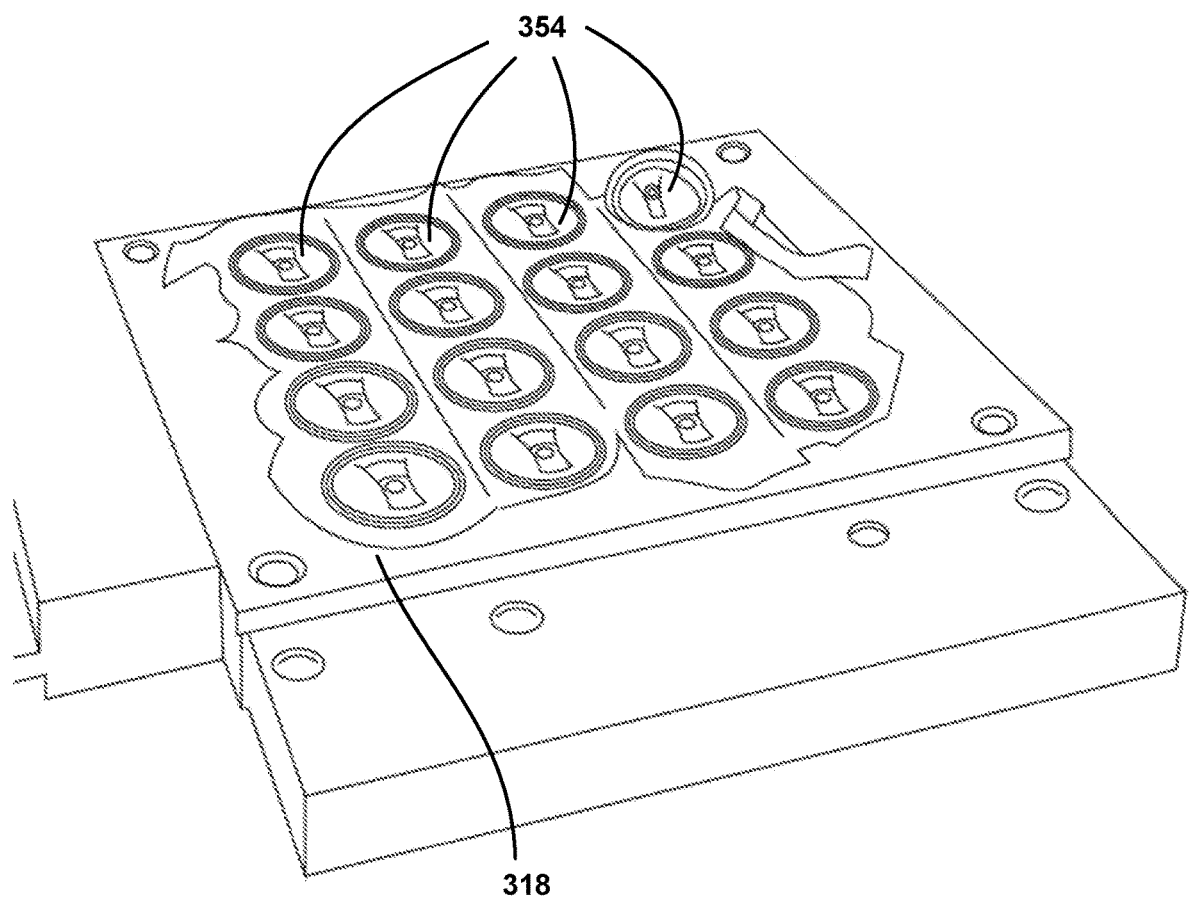

FIG. 34 shows the positioning of various soft top inserts 354 webbed together after the compression molding process has occurred and the upper layer has been removed from the middle layer mold 318.

Figure 35:
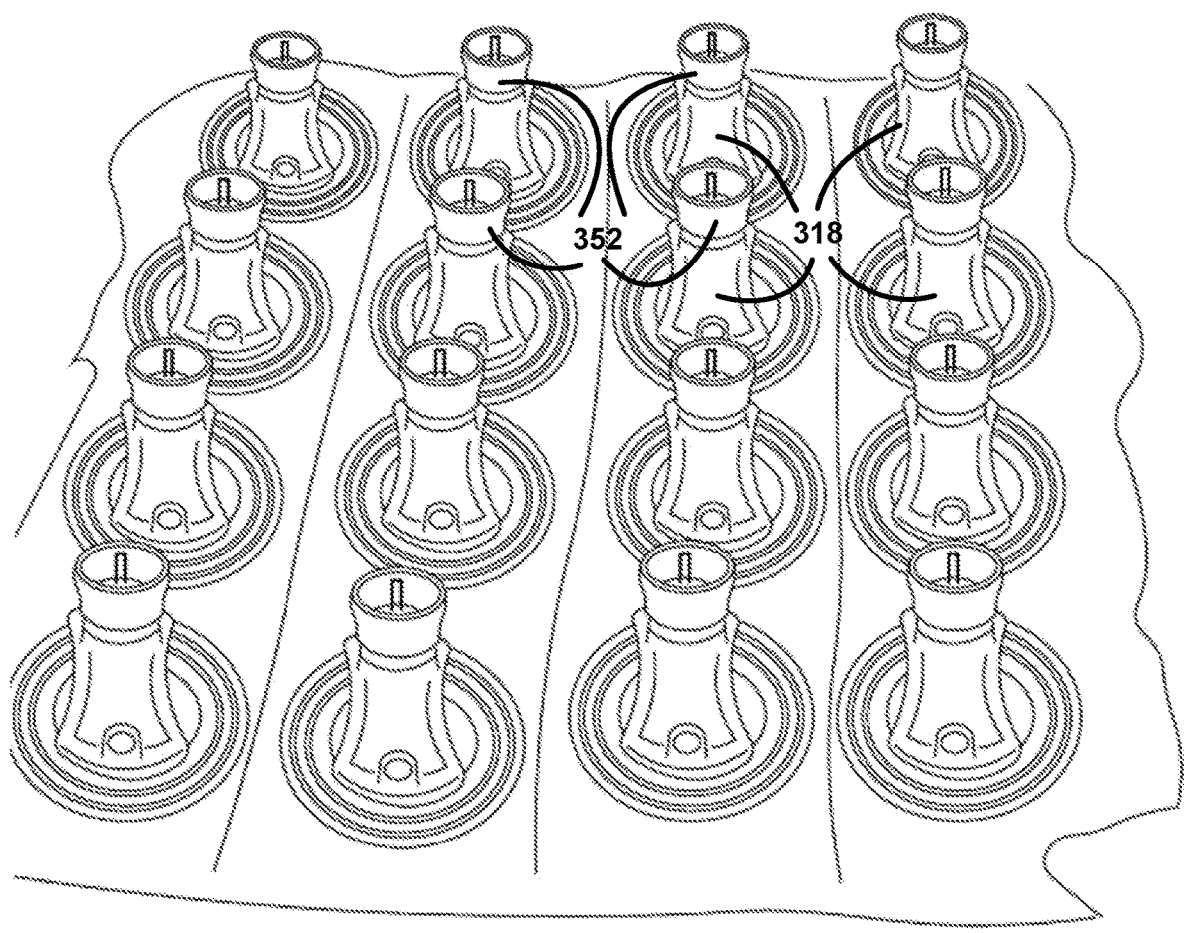

FIG. 35 depicts the various soft top inserts 308 webbed together prior to removal of excess material flashing between adjacent soft top inserts 308. The complete spouts 352 are removed from the mold and set to cool.

The illustrations and examples provided herein are for explanatory purposes and are not intended to limit the scope of the appended claims. It will be recognized by those skilled in the art that changes or modifications may be made to the above described embodiment without departing from the broad inventive concepts of the invention. It is understood therefore that the invention is not limited to the particular embodiment which is described, but is intended to cover all modifications and changes within the scope and spirit of the invention.

What is claimed is:

1. A soft top insert, comprising:
  a spout comprising:
    a lower end having a first external circumference;
    a top portion having a second external circumference; and
    a middle portion having an external circumference that is smaller than the first external circumference of the lower end and the second external circumference of the top portion,
    wherein at least the middle portion is composed of a first material having a first durometer to prevent the spout from being torn from the bite of a child user; and
  a base of a lid which is adapted to be sealingly attachable to a container, and comprising an upper end, a lower base end, a ventilation shaft on the upper end, wherein the base and spout lower end comprise a second material that connects with the first material in the middle portion of the spout, and which second material has a second durometer less than the first durometer of the first material,
  wherein the middle portion of the spout is a separate structure than and is attached to the lower end of the spout at a point of attachment, wherein the point of attachment forms a circumferential external bump which projects outwardly from an external surface of the middle portion, and further forms a circular internal channel.

2. The soft top insert of claim 1, wherein the spout is comprised substantially of the first material which has a higher durometer than the second material, which comprises all of the base.

3. The soft top insert of claim 1, wherein the spout includes the first material on an upper end, which is away from the lower end that is attached to the upper end of the base; the spout upper end comprised of the first material, and the spout lower end and the base comprised of the second material.

4. The soft top insert of claim 1, wherein the upper end of the base is attached to the lower end of the spout via a compression molding process.

5. A bottle, comprising:
  a container for holding fluid; and
  a lid for sealingly attaching to the container to contain fluid therein; and including a spout comprising:
    a lower region having a first external circumference;
    a top portion having a second external circumference; and
    a middle portion having an external circumference that is smaller than the first external circumference of the lower region and the second external circumference of the top portion, and comprised of a first material having a first durometer to prevent the spout from being torn from the bite of a child user;
  a base on the lid composed of a second material and comprising a ventilation shaft on an upper end;
  wherein the spout middle portion is comprised of the first material, and the spout lower region and the base are comprised of the second material;
  wherein the lower region of the spout is a separate structure than and is attached to the middle portion of the spout at a point of attachment, wherein the point of attachment forms a circumferential external bump which projects outwardly from an external surface of the middle portion, and further forms a circular internal channel.

6. The bottle of claim 5, wherein the spout is comprised substantially of the first material which has a higher durometer than the second material, which comprises all of the base.

7. The bottle of claim 5, wherein the spout includes multiple materials having differing durometers, the highest durometer material being furthest away from the base.

\* \* \* \* \*